US011386444B2

(12) United States Patent
Singh et al.

(10) Patent No.: US 11,386,444 B2
(45) Date of Patent: Jul. 12, 2022

(54) METHODS AND SYSTEMS FOR PROVIDING REWARD BASED VERIFIED RECOMMENDATIONS

(71) Applicant: Coracias Advanced Technologies LLC, Dover, DE (US)

(72) Inventors: Dhananjay Singh, Allahabad-Prayagraj (IN); Bharat S Rawalkshatriya, Erie, PA (US)

(73) Assignee: CORACIAS ADVANCED TECHNOLOGIES LLC, Dover, DE (US)

( * ) Notice: Subject to any disclaimer, the term of this patent is extended or adjusted under 35 U.S.C. 154(b) by 17 days.

(21) Appl. No.: 16/859,601

(22) Filed: Apr. 27, 2020

(65) Prior Publication Data

US 2021/0334836 A1    Oct. 28, 2021

(51) Int. Cl.
*G06Q 30/02* (2012.01)
*G06N 5/04* (2006.01)
*G06N 20/00* (2019.01)
*H04L 9/30* (2006.01)

(52) U.S. Cl.
CPC ........... *G06Q 30/0214* (2013.01); *G06N 5/04* (2013.01); *G06N 20/00* (2019.01); *H04L 9/302* (2013.01)

(58) Field of Classification Search
USPC ...................................... 705/14, 319, 14.16
See application file for complete search history.

(56) References Cited

U.S. PATENT DOCUMENTS

| 10,981,564 B2* | 4/2021 | Herman | G08G 1/166 |
|---|---|---|---|
| 2014/0344261 A1* | 11/2014 | Navta | G06F 16/951 |
| | | | 707/723 |
| 2015/0180839 A1* | 6/2015 | Moffat | H04L 63/0435 |
| | | | 713/150 |
| 2015/0221079 A1* | 8/2015 | Schultz | G06V 30/422 |
| | | | 382/190 |
| 2015/0242931 A1* | 8/2015 | Stoll | G06Q 30/0631 |
| | | | 705/26.7 |

(Continued)

OTHER PUBLICATIONS

Loyalty Points on the Blockchain (Year: 2018).*
(Continued)

*Primary Examiner* — Gautam Ubale
(74) *Attorney, Agent, or Firm* — Hauptman Ham, LLP

(57) ABSTRACT

Methods and systems for providing reward based verified recommendations. A method disclosed herein includes broadcasting a recommendation request to a plurality of registered users, on receiving the recommendation request from a customer. The method further includes receiving and verifying an input from at least user of the plurality of users in response to the broadcasted recommendation request using a blockchain. The received input relates to the recommendation request and the input includes at least one of at least one service provider and at least one service provided by the at least one service provider. The method also includes issuing reward points (RPs) to the at least one user who has provided the input and the service provider who is included in the input on verifying the input. The method further includes providing at least one recommendation to the requested customer using the verified input and maintained previous recommendations.

26 Claims, 14 Drawing Sheets

(56) References Cited

U.S. PATENT DOCUMENTS

| | | | |
|---|---|---|---|
| 2015/0278916 A1* | 10/2015 | Stoll | G06Q 30/0609 |
| | | | 705/26.7 |
| 2015/0278917 A1* | 10/2015 | Stoll | G06Q 30/0635 |
| | | | 705/26.7 |
| 2015/0310470 A1* | 10/2015 | Mathew | G06Q 20/3224 |
| | | | 705/38 |
| 2019/0066119 A1* | 2/2019 | Sengupta | G06Q 30/0282 |
| 2019/0073666 A1* | 3/2019 | Ortiz | G06Q 20/3674 |
| 2019/0188806 A1* | 6/2019 | Torrenegra | G06F 17/11 |
| 2019/0311392 A1* | 10/2019 | Swamidurai | H04L 63/0442 |
| 2019/0329771 A1* | 10/2019 | Wray | B60W 30/18163 |
| 2019/0381999 A1* | 12/2019 | Yu | G05D 1/0088 |
| 2019/0385130 A1* | 12/2019 | Mossoba | G06Q 20/3224 |
| 2020/0055515 A1* | 2/2020 | Herman | G06V 10/82 |
| 2020/0242669 A1* | 7/2020 | Carroll | G06N 20/00 |
| 2021/0208915 A1* | 7/2021 | Hogan | G06F 9/5088 |
| 2021/0374132 A1* | 12/2021 | Yang | G06F 16/2457 |

OTHER PUBLICATIONS

End-to-End Privacy for Open Big Data Markets (Year: 2015).*
On_the_Convergence_of_Artificial_Intelligence_and_Distributed_Ledger_Technology_A_Scoping_Review_and_Future_Research_Agenda (Year: 2020).*
Privacy_Enhancement_Scheme_PES_in_a_Blockchain-Edge_Computing_Environment (Year: 2020).*

* cited by examiner

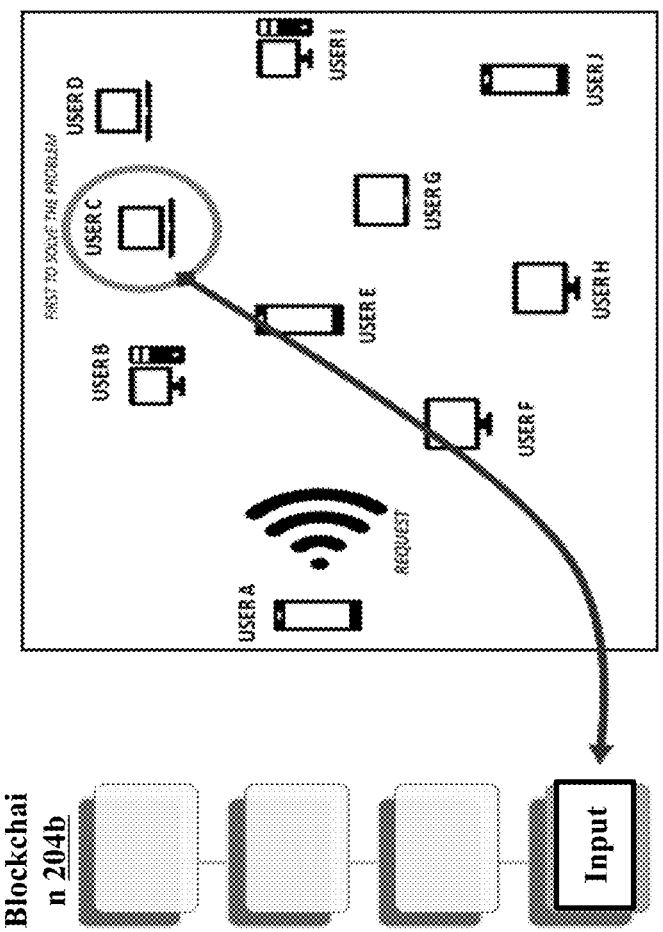

METHODS AND SYSTEMS FOR PROVIDING REWARD BASED VERIFIED RECOMMENDATIONS

TECHNICAL FIELD

The embodiments herein relate to providing recommendations and, more particularly, to providing reward based verified recommendations to users.

BACKGROUND

Currently, recommendation systems are used by online providers to provide recommendations that might be interested to users/customers. The recommendations herein refer to recommending at least one of products, services, content, media, advertisements, and so on.

In conventional approaches, the recommendations can be provided to the users by harnessing inputs collected from other users or subject matter experts. Examples of the inputs can be, but not limited to, feedbacks, experiences, recommendations, ratings, reviews, discussions, and so on related to at least one of the products, the services, the content, the media, and so on. However, the users may act out of self-interest and skew inputs/ratings/recommendations for specific reasons. Further, the conventional approaches do not involve any steps for verifying trustworthiness of the users, who have provided the inputs. Thus, the inputs provided by such users may often subjected to personal biases and distort true value of at least one of the products, services, content, media, and so on.

In addition, the users may not be interested in providing the inputs always, since there is no passive incentive to encourage the users to provide the inputs.

Thus, the recommendations provided by relying on the inputs of the other users may be ill suited or inaccurate for the specific user.

BRIEF DESCRIPTION OF THE FIGURES

The embodiments disclosed herein will be better understood from the following detailed description with reference to the drawings, in which:

FIG. 5 is an example diagram depicting verification of inputs received from the at least one registered user, according to embodiments as disclosed herein;

DETAILED DESCRIPTION OF EMBODIMENTS

Figure 1A:
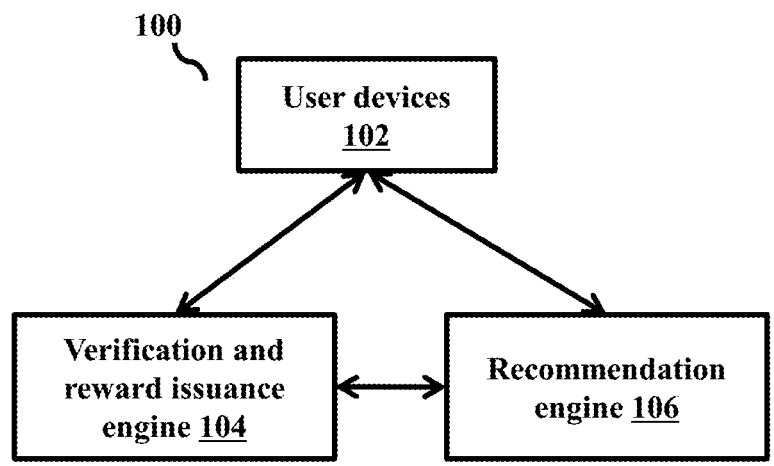
FIGS. 1a and 1b depict a recommendation system, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Embodiments herein disclose methods and systems for providing reward based verified recommendations.

Embodiments herein disclose methods and systems for receiving at least one input from at least one registered user on broadcasting a recommendation request of a customer to a plurality of registered users and verifying the received at least one input using a blockchain. The at least one input can be related to the recommendation request and can include at least one of at least one service provider and at least one of products, services, content/information, applications, media, and so on provided by the at least one service provider.

Embodiments herein disclose methods and systems for issuing reward points (RPs) to the at least one registered user, who has provided the verified input and to the at least one service provider, who has included in the verified input.

Embodiments herein disclose methods and systems for providing at least one recommendation to the requested customer using the verified input and maintained previous recommendations.

Referring now to the drawings, and more particularly to FIGS. 1 through 11, where similar reference characters denote corresponding features consistently throughout the figures, there are shown embodiments.

Figure 1B:
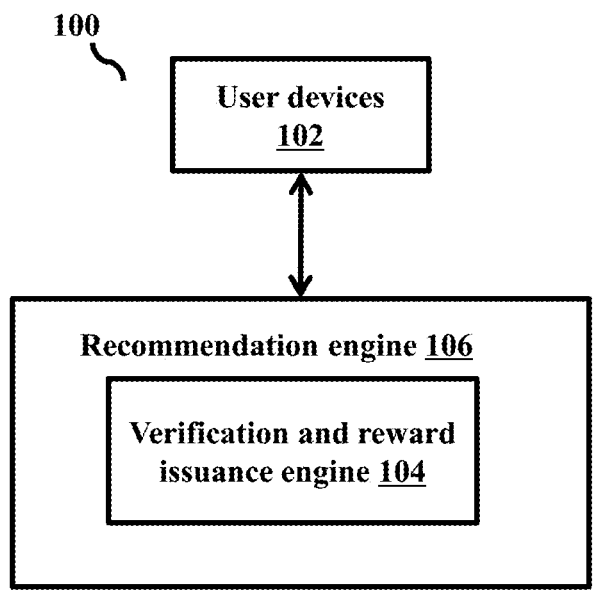

FIGS. 1a and 1b depict a recommendation system 100, according to embodiments as disclosed herein. The recommendation system 100 referred herein can be implemented in various domains such as, but not limited to, a medical field, a hospitality industry, a marketing industry, a riding service, and so on. In an embodiment, the recommendation system 100 can be configured to provide recommendations by verifying/authenticating inputs received from users of the recommendation system 100.

The recommendations can be referred to recommending at least one of product/item (for example: medicines, groceries, food items, or any other material things), services/service providers (for example: hospitals/clinics, medical shops, doctors, surgeons, restaurants, grocery shops, movie theaters, taxi services, and so on), information/content about the product/services, media (for example: audios, images, videos, animations, and so on), applications (for example: a health application, a media application, a marketing application, and so on), advertisements, and so on. In an embodiment, the products, the services, the content/information, the media, the advertisements, the applications, and so on are collectively referred as services through the document.

The users referred herein can include customers, service providers, input providers/subject experts, and so on. The customer(s) can be an individual or an organization, who requests the recommendations for at least one of the products, the services/service providers, the content, the media, the applications, the advertisements, and so on. Embodiments herein use the terms such as "consumers", "clients", "customers", "first users", and so on interchangeably. The service provider(s) can be an individual (for example: a doctor, a surgeon, or the like) or an enterprise/firm (for example: a hospital/clinic, a medical shop, a restaurant, a grocery shop, or the like), who provides the services to the customers. Embodiments herein use the terms such as "service providers', "product suppliers", "manufacturers", "third users", and so on. The customers and/or the service providers and/or subject experts and/or other users may be allowed to provide the inputs. Embodiments herein use the terms such as "registered users", "second users", "input providers", "subject experts", and so on interchangeably to refer to an individual, or an organization that provides the inputs. Examples of the inputs can be, but not limited to, feedbacks, ratings, reviews, recommendations, likes, shares, subscriptions, suggestions, discussions, and so on related to at least one of the products, the services/service providers, the content, the media, the applications, and so on provided by the at least one service provider. In an embodiment, the term "users" mean the customers and/or the service providers and/or the input providers/subject experts through the document.

The recommendation system 100 includes user device(s) 102, a verification and reward issuance engine 104, and a recommendation engine 106. The user device 102, the verification and reward issuance engine 104, and the recommendation engine 106 can communicate with each other using a communication network. Examples of the communication network can be, but is not limited to, the Internet, a wireless network (a Wi-Fi network, a cellular network, a Wi-Fi Hotspot, Bluetooth, Zigbee and or the like), a wired network, and so on.

The user device(s) 102 can be a device used by the user(s) to communicate with the verification and reward issuance engine 104, and the recommendation engine 106. Examples of the user device 102 can be, but is not limited to, a mobile phone, a smart phone, a tablet, a computer, a wearable computing device, an IoT (Internet of Things) device, a vehicle instrument console, a vehicle infotainment system, and so on. The users can be allowed to register with the verification and reward issuance engine 104 using the user device 102 for receiving the recommendations and providing the inputs related to at least one of the products, the services/service providers, the content, the media, the applications, and so on. The service providers can be allowed to register their service details with the verification and reward issuance engine 104 using the user/service provider device 102. Examples of the service details can be, but not limited to, availability, cost, current ratings/reviews, description/details, or the like of at least one of the product, the service, the media, the content, the applications, and so on provided by the service providers.

The verification and reward issuance engine 104 can be configured to issue reward point identifiers (RP-IDs) for the users when the users register for receiving the recommendations, providing the inputs, and so on. The RP-ID(s) can be a unique identifier that allows the users to receive the recommendations, and provide the inputs and the service providers to register their service details.

The verification and reward issuance engine 104 receives a registration request from the user(s) for the RP-ID(s). The registration request may include at least one of user details, the service details, and so on. Examples of the user details can be, but is not limited to, a user name, a phone number, an email address, age, gender, a picture, and so on. On receiving the registration request, the verification and reward issuance engine 104 generates the RP-ID and communicates the generated RP-ID to the user. The verification and reward issuance engine 104 may apply at least one cryptography method on the user details and/or the service details of the received registration request for generating the RP-ID for the requested user. The RP-ID can be a cryptographic-ID. In an example herein, the verification and reward issuance engine 104 may use a RSA (Rivest-Shamir-Adleman) cryptography method for generating the RP-ID for the user, but it may be obvious to a person skilled in the art that any other cryptography methods can be used for generating the RP-ID. The RSA cryptography method involves generating public keys for the user, generating a plain identifier (plain_id) for the user by converting the associated user details into a number, and calculating encrypted data using the generated plurality of public keys, and the plain-id. The generated encrypted data is the RP-ID of the user.

The verification and reward issuance engine 104 also maps and stores the generated RP-ID with the user details and/or the service details of the user. The verification and reward issuance engine 104 provides information such as, but not limited to, the user details of the service providers, the service details registered by the service providers, the RP-ID of the service providers, and so on to the recommendation engine 106.

The verification and reward issuance engine 104 can also be configured to receive and verify the inputs provided by the at least one user related to at least one of the products, the services/service providers, the content, the media, the applications, and so on. The verification and reward issuance engine 104 may receive recommendation request(s) from the user(s) for the recommendations. The recommendation request may include at least one of the RP-ID of the requested user, a query related to at least one of the products, the services/service providers, the content, the media, the applications, and so on, in which the user is interested. On receiving the recommendation request, the verification and reward issuance engine 104 broadcasts the recommendation request of the requested user to the other users registered with the verification and reward issuance engine 104. In response to the broadcasted recommendation request, the at least one registered user may provide the input(s) to the verification and reward issuance engine 104.

On receiving the input from the at least one registered user, the verification and reward issuance engine 104 performs a verification/validation process to check if the at least one user who has provided the input is an approved legitimate user (trustworthiness of the at least one user) and if the input is an unbiased input (fair/impartial input). In an embodiment, the verification and reward issuance engine 104 performs the verification process using a blockchain networking system 204 comprising a plurality of computing nodes 204a and a blockchain 204b (as depicted in FIG. 2c). In an embodiment, a number of computing nodes 204a can be dynamically modified according to traffic present in the blockchain networking system 204, wherein the traffic depicts a number of requests/load received/pending in the blockchain networking system 204 for verifying the at least one user, and the associated input. In an example, the computing nodes 204a may be increased when the traffic in the blockchain networking system 204 increases, and the computing nodes 204a may be decreased when the traffic in the blockchain networking system 204 decreases.

The verification and reward issuance engine 104 provides the input received from the at least one user and the RP-ID of the corresponding user to the plurality of computing nodes 204a. The computing nodes 204a can use a proof-of user (POU) method for verifying the at least one user based on the associated RP-ID and the received input from the corresponding at least one user. The POU method includes checking each RP-ID to its corresponding user using decrypted data. The decrypted data can be a function of the encrypted data (i.e. the RP-ID), a private key, and one of the public keys generated by the verification and reward issuance engine 104 for assigning the RP-ID to the user.

The verification and reward issuance engine 104 collects results of the verification from the computing nodes 204a and checks if a number of computing nodes 204a verified the at least one user and the received input from the corresponding at least one user is greater than a threshold. The threshold can be a number of computing nodes 204a pre-defined by the verification and reward issuance engine 104 for verification. In an embodiment, the threshold can be defined based on a total number of computing nodes 204a present in the blockchain networking system 204. In an example herein, the threshold can be a half of the total number of computing nodes 204a present in the blockchain networking system 204. The threshold can be varied dynamically based on the number of computing nodes 204a present in the blockchain networking system 204. The threshold depicting a half of the total number of computing nodes 204a may keep the probability of any computing node 204a being busy is 0.5, thereby reducing the time wasted by finding the computing nodes 204a. If the number of computing nodes 204a verified the at least one user and the received input from the corresponding at least one user is greater than the threshold, the verification and reward issuance engine 204 accepts the input as the verified input (newest/latest recommendation) for the received recommendation request and stores the verified input in the blockchain 204b. Otherwise, the verification and reward issuance engine 104 discards the received input and waits for at least one other input from other users.

The verification and reward issuance engine 104 can also be configured to issue reward points (RPs) to the RP-ID of the at least one user, who has provided the verified input/latest recommendation. The verification and reward issuance engine 104 also provides the RPs to the RP-ID of the at least one service provider who is included in the verified input or whose at least one of the products, the services, the content, the media, the applications, are included in the verified input/newest recommendation (hereinafter referred as the service provider who has bought the verified input/RPs). The RPs can be issued to the users for encouraging the users to participate in providing the input and building a trust in the users for their inputs. In an example herein, the RPs can be at least one of currencies, loyalty points, badges, vouchers, transaction units, incentives, health check-up offers, and so on. The RPs may also be exchanged between the customers and the service providers for at least one of the products, the services, the content, the media, the applications, and so on. In an embodiment, the RPs may vary depending on a type of domain/field in which the recommendation system 100 is employed. In an example, consider that the recommendation system 100 is employed in a hospital/medical domain. In such a case, the user/patient may be issued with free health check-up offers as the RPs.

The verification and reward issuance engine 104 can generate the RPs to the at least one user and tags the generated RPs with the RP-ID of the at least one user, once the input/latest recommendation, which can be provided/ bought by the corresponding at least one user, is verified. The verification and reward issuance engine 104 can also tag the generated RPs with the verified input/latest recommendation, that have been provided by the at least one user. In an embodiment, the verification and reward issuance engine 104 can generate the RPs using factors such as, but not limited to, frequency of the verified input/latest recommendation, a number of conversions of the verified input into the recommendations, the RPs already associated with the RP-ID of the users, who have provided/bought the verified input/latest recommendation, cost of the verified input/latest recommendation, position of the verified input/recommendation on the blockchain 204b/recommendation engine 106, and so on. In an embodiment, the verification and reward issuance engine 104 may use a RP module for generating the RPs, wherein the RP module may be a mathematical model. The verification and reward issuance engine 104 may provide the factors to the RP module, which may output an optimized value of the RPs.

Once the RPs are issued, the verification and reward issuance engine 104 provides the recommendation request received from the requested user, the verified input (the latest recommendation) for the received recommendation request and the associated RPs (issued to the at least one user who has provided or bought the verified input/latest recommendation), and so on to the recommendation engine 106 for providing the recommendation(s) to the requested user.

The verification and reward issuance engine 104 may also use the RP module to dynamically update/modify the RPs associated with the recommendations based on at least one of transactions between the users, recommendations provided by the recommendation engine 106 to the requested user, removal of the inputs/recommendations from the blockchain 204b, and so on. The verification and reward issuance engine 104 communicate the updated RPs of the recommendations to the recommendation engine 106.

The recommendation engine 106 can be configured to provide the recommendations to the requested user using the received verified input/latest recommendation and the associated RPs. The recommendation engine 106 may maintain the recommendations provided for the previous recommendation requests of the users and associated recommendation details. The recommendation details can include information such as, but not limited to, the RP-IDs of the users, who have provided/bought the recommendations, the RPs associated with the RP-IDs of the users, who have provided/bought the recommendations, a frequency of the recommendations, a cost of the recommendations, date of the recommendations, and so on. In an embodiment, the recommendation engine 106 can distribute/position the recommendations and the associated recommendation details across multiple lists/tiers of recommendations, thereby indicating priority of the recommendations. Embodiments herein use the terms such as "list of recommendations", "tier of recommendations", "segments of recommendations", and so on interchangeably. In an example herein, the multiple tiers of recommendations can include at least one of a primary tier, a secondary tier, and a tertiary tier. The recommendations positioned at the primary tier may have the highest priority and the recommendations positioned at the tertiary tier may have the lowest priority. The recommendations and the associated details may be positioned at the appropriate tier of recommendations by comparing at least one of the RPs associated with the recommendations with RP threshold criteria associated with each tier of recommendation, and so on. The RP threshold criteria can be a range of values consisting of lower and upper limits for the RPs that is pre-defined by the recommendation engine 106. For example, consider that RP threshold can be pre-defined as "above 50" for the primary tier. In such a case, the recommendations associated with more than 50 RPs can be included in the primary tier. In an embodiment, the recommendation engine 106 may use a limit module for defining the lower, and upper limits of the RP threshold criteria based on at least one of previous transactions that have taken place in the blockchain networking system 204, and so on. The limit module can be a mathematical model.

The recommendation engine 106 receives the recommendation request received from the requested user, and the verified input for the received recommendation request and the associated RPs from the verification and reward issuance engine 104. The recommendation engine 106 checks if the received verified input matches with the recommendations present in any of the multiple tiers of recommendations. If the received verified input does not match with the recommendations present in any of the multiple tiers of recommendations, then the recommendation engine 106 adds the received verified input as the latest recommendation and the associated RPs/recommendation details to the tier of the lowest priority (for example: the tertiary tier).

If the received verified input matches with the recommendation present in any of the tiers of recommendations, the recommendation engine 106 identifies the tier associated with the matched recommendation and determines the identified tier as the current tier for the received verified input. The recommendation engine 106 then compares the RPs associated with the received verified input (the latest recommendation) with the RP threshold criteria associated with the identified current tier and determines an updated tier for the received verified input/recommendation. The updated tier can be determined as a succeeding tier if the RPs associated with the received verified recommendation is greater than the RP threshold criteria of the current tier. The updated tier can be determined as a same present tier if the RPs associated with the received verified recommendation is equal to the RP threshold criteria of the current tier. The updated tier can be determined as a preceding tier if the RPs associated with the received verified recommendation is lesser than the threshold criteria of the current tier. On determining the updated tier, the recommendation engine 106 transfers the recommendation corresponding to the received verified input from the current tier to the updated tier, thereby updating the positions of the recommendations across the tiers of recommendations.

Once the positions of the recommendations are updated, the recommendation engine 106 selects the recommendation(s) from the tier of recommendations with the highest priority (for example: the primary tier). The recommendation engine 106 can select the recommendation based on the received recommendation request, the recommendation details associated with the recommendations, and so on. The recommendation engine 106 provides the selected recommendation to the requested user. Thus, the recommendations provided to the user can be reliable, relevant, and accurate.

After providing the recommendation to the requested user, the recommendation engine 106 updates the recommendation details (such as the frequency of recommendations, the RPs or the like) associated with the provided recommendation. The recommendation engine 106 further communicates the provided recommendation and the updated recommendation details to the verification and reward issuance engine 104, wherein the verification and reward issuance engine 104 may modify (increase/decrease) the RPs associated with the provided recommendation. The recommendation engine 106 receives the modified RPs associated with the provided recommendation and changes the position of the provided recommendation across the multiple tiers of recommendations. Thus, relevant, reliable, and decentralized reward based recommendations can be maintained by the recommendation engine 106.

In an embodiment, the recommendation engine 106 can be the verification and reward issuance engine 104 as depicted in FIG. 1*b*, that can perform the intended functions of the recommendation engine 106. The verification and reward issuance engine 104 depicted in FIG. 1*b* can receive and verify the inputs/recommendations from the at least one registered user, and provide the recommendation to the user using the verified input and the previously maintained recommendations.

FIGS. 1*a* and 1*b* show exemplary units of the recommendation system 100, but it is to be understood that other embodiments are not limited thereon. In other embodiments, the recommendation system 100 may include less or more number of units. Further, the labels or names of the units are used only for illustrative purpose and does not limit the scope of the embodiments herein. One or more units can be combined together to perform same or substantially similar function in the recommendation system 100.

Figure 2A:
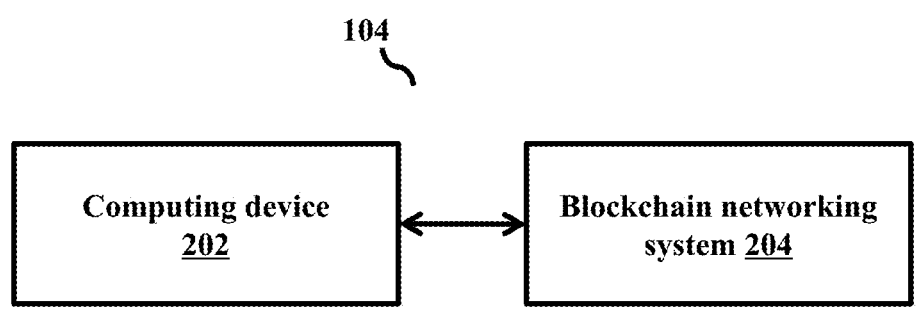
FIG. 2a depicts a verification and reward issuance engine of the recommendation system, according to embodiments as disclosed herein.

FIG. 2*a* depicts the verification and reward issuance engine 104, according to embodiments as disclosed herein. The verification and reward issuance engine 104 includes a computing device 202, and the blockchain networking system 204. The computing device 202 can communicate with the blockchain networking system 204 using the communication network. The computing device 202 can be configured to issue the RP-ID and the RPs to the users. The blockchain networking system 204 can be configured to verify the inputs received from the at least one user in response to the recommendation request.

Figure 2B:
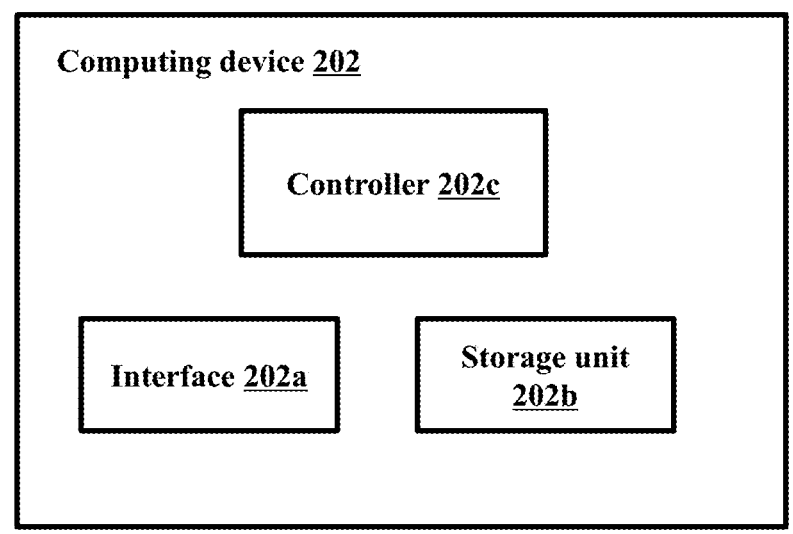
FIG. 2b is block diagram depicting various components of a computing device of the verification and reward issuance engine, according to embodiments as disclosed herein.
Figure 2C:
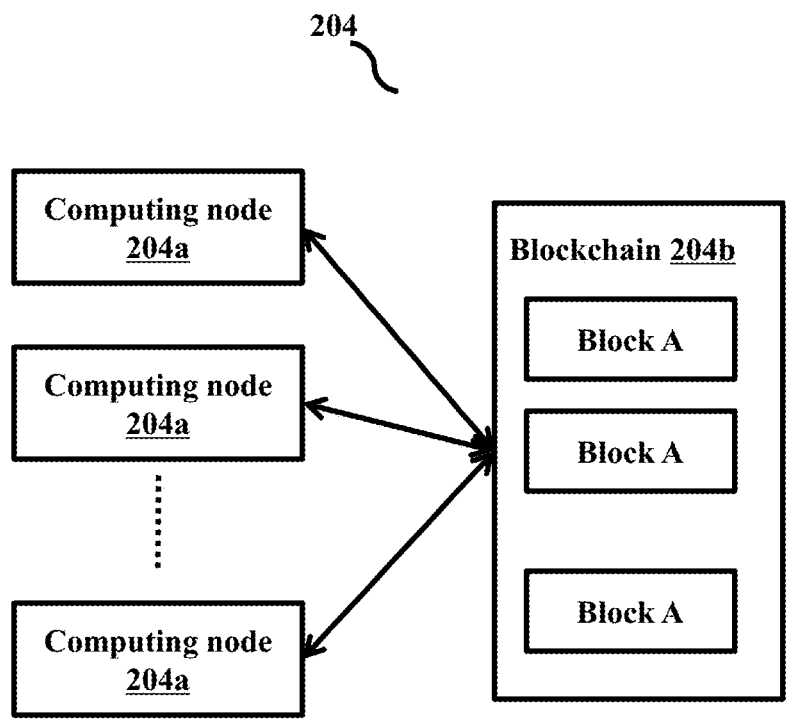
FIG. 2c is a block diagram depicting a blockchain networking system, according to embodiments as disclosed herein.

As depicted in FIG. 2*b*, the computing device 202 can be at least one of a cloud computing device (can be a part of a public cloud or a private cloud), a server, and so on. The server may be at least one of a standalone server, a server on a cloud, or the like. The computing device 202 can also be, but not limited to, a personal computer, a notebook, a tablet, desktop computer, a laptop, a handheld device a mobile device, and so on.

The computing device 202 includes an interface 202*a*, a storage unit 202*b*, and a controller 202*c*. The computing device 202 can also include at least one of a display, an Input/Output (I/O) modules, communication ports, and so on (not shown). The interface 202a can be configured to enable the computing device 202 to communicate with at least one external entity (for example: the user devices 102, the recommendation engine 106, the blockchain networking system 204 or the like) using the communication network. The storage unit 202b can store at least one of the user details and the service details, the mapping of the RP-IDs with the user details and/or the service details of the users, the RPs associated with the RP-ID of the users, the recommendations provided by the users, and so on. The storage unit 202b can be at least one of a database, a memory, file storage, cloud storage, and so on.

The controller 202c can be at least one of a single processor, a plurality of processors, multiple homogenous cores, multiple heterogeneous cores, multiple Central Processing Unit (CPUs) of different kinds, microprocessors, accelerators, and so on. The controller 202c can be configured to issue the RP-IDs for the users during the registration, receive and verify the input(s) from the registered at least one user, and issue the RPs to the users, who has provided or bought the verified inputs.

The controller 202c receives the registration request from the user (the customer or the service provider) for the RP-ID. The registration request may include the user details such as, but not limited to, a user name, a phone number, an email address, age, gender, a picture, and so on and/or the service details such as, but not limited to, availability, cost, current ratings/reviews, description/details, or the like of at least one of the product, the service, the media, the content, the applications, and so on provided by the service providers. In an embodiment, the controller 202c uses the RSA method, or the like to generate the RP-ID for the user.

Embodiments herein are further explained considering the RSA method as an example for generating the RP-ID for the user, but it may obvious to a person skilled in the art that any other suitable methods can be considered for generating the RP-ID for the user. On receiving the registration request from the user, the controller 202c generates the public keys (n, e) for the user. For generating the public keys, the controller 202c selects two prime numbers 'p', and 'q', and calculates their product as:

$$n = p * q$$

The controller 202c then selects a number for example 'e', that is greater than 1 and less than (p−1), and (q−1), and that is having no common factor of the (p−1), and the (q−1). The controller 202c may use the product of the two prime numbers 'n', and the selected number 'e' as the two public keys. The controller 202c does not provide the public keys to the user. After generating the public keys, the controller 202c generates a private key 'd' for the user using the below relation:

$$d = (k * \mathrm{phi}(n) + 1) / e$$

wherein, phi(n)=((p−1)*(q−1)), and k is a random integer. The private key can be used for verifying the user. The controller 202c then calculates the encrypted data using the plain_id, and the public keys. In an embodiment, the plain_id can be generated by converting the user details and/or the service details received from the user into the number. The controller 202c can calculate the encrypted data using the below equation:

$$c = (\mathrm{plain\_id})^e \bmod n$$

wherein, the encrypted data c is the RP-ID generated for the user.

On generating the RP-ID for the user, the controller 202c maps the RP-ID with the user details and/or service details of the user and stores the mapping of the RP-ID with the user details and/or the service details of the user in the storage unit 202b. The controller 202c may also update the stored user details or service details on receiving information about a change in the service details or the user details from the users. The controller 202c communicates the user details, the service details, the change in the service details or the user details, and so on to the recommendation engine 106.

The controller 202c receives the recommendation request from the user (the consumer/first user) for the recommendations, in which the user may be interested. The recommendation request includes the RP-ID of the requested user, and the query related to at least one of at least one of the products, the services/service providers, the content, the media, the applications, and so on. On receiving the recommendation request, the controller 202c verifies if the user is a registered user. The controller 202c checks if the received RP-ID of the requested user is present in the stored mapping of the RP-IDs with the users. If the received RP-ID is not present in the stored mapping of the RP-IDs with the users, the controller 202c verifies that the user is not a registered user and sends a message to the user to register with the computing device 202 of the verification and reward issuance engine 104. If the received RP-ID is present in the stored mapping of the RP-IDs with the users, the controller 202c verifies that the user is a registered user. On verifying, that the user requested for the recommendations is a registered user, the controller 202c broadcasts the received recommendation request to the registered users of the recommendation system 100. In response to the broadcasted recommendation request, the controller 202c may receive the input(s) from the registered at least one user. The input can be related to the query received from the requested user for at least one of the products, the services/service providers, the content, the media, the applications, and so on.

On receiving the input from the registered at least one user, the controller 202c provides the received input and the RP-ID of the corresponding at least one user to the computing nodes 204a of the blockchain networking system 204. The computing nodes 204a can perform the verification process to check if the at least one user who has provided the input is the approved legitimate user and if the corresponding inputs are the unbiased inputs. The controller 202c further collects results of the verification process (verified/accept or unverified/reject) from the computing nodes 204 and accepts/rejects the received input based on the results. The controller 202c checks if the number of the number of computing nodes 204a verified the at least one user and the received input from the corresponding at least one user is greater than a threshold. If the number of computing nodes 204a verified the at least one user and the received input from the corresponding at least one user is greater than the threshold, the controller 202c accepts the received input as the verified input or the newest/latest recommendation for the received recommendation request and stores the verified input in the blockchain 204b. In an embodiment, the controller 202c may pre-define the threshold based on the total number of computing nodes 204a present in the blockchain networking system 204. The controller 202c may dynamically vary the threshold on determining a change in the total number of computing nodes 204a present in the blockchain networking system 204.

Once the received input and the corresponding at least one user is verified, the controller 202c generates and issues the RPs to the at least one user who has provided the verified input or the at least one user who has bought the verified input (the at least one service provider included in the verified input). In an embodiment, the controller 202c can generate the RPs using factors such as, but not limited to, frequency of the verified input/latest recommendation, a number of conversions of the verified input into the recommendations, the RPs already associated with the RP-ID of the users, who have provided/bought the verified input/latest recommendation, cost of the verified input/latest recommendation, position of the verified input/recommendation on the blockchain 204b/recommendation engine 106, and so on. The controller 202c provides the factors as inputs to the RP module, which can output the optimized value of the RPs.

In an example herein, the verification and reward issuance engine 104 can generate higher RPs for the RP-ID of the at least one user, when the frequency of the verified input provided by the at least one user is high, or when the at least one user already has the high RPs, or the like. The RPs may dependent on the type of the domain in which the recommendation system 100 is employed. In an example, the RPs can be, but not limited to, monetary discount, vouchers, loyalty points, incentives, health check-up offers, and so on. The controller 202c tags the issued RPs to the RP-ID of the at least one user, who has provided or bought the verified input. The controller 202c stores the verified/accepted input, the RPs tagged with the RP-ID of the at least one user, in the storage unit 202b.

The controller 202c may also collect information from at least one of the recommendation engine 106, the customers, and the service providers (the users), the blockchain networking system 204 in a real-time or at a pre-defined time intervals or on occurrence of events (for example: on receiving the recommendation request or the like) and dynamically modifies (increases/decreases) the RPs issued to the RP-IDs of the users. Examples of the collected information can be, but not limited to, the recommendations provided by the recommendation engine 106 for the received requests, transactions between the users (between at least one of the consumers and the service providers, the service providers, and the consumers), the position of the recommendations in the tiers of the recommendation engine 106, customer experience received from the requested user/customer for the provided recommendations, the recommendation details associated with the recommendations, removal of the recommendations/verified inputs from the blockchain 204b, and so on. For example, the controller 202c may increase the RPs for the at least one user, when the inputs provided by the at least one user is provided as the recommendations by the recommendation engine 106 to the requested user or when the requested user/customer reports good experience related to the recommendations that have provided/bought by the corresponding at least one user, or when the user/customer performs the transactions with the service provider included in the recommendations, or the like. The controller 202c may decrease the RPs for the at least one user, when the requested user/customer reports bad experience related to the recommendations that have provided/bought by the corresponding at least one user, or when the recommendations provided/bought by the corresponding at least one user are removed from the tiers of the recommendation engine 106/from the blockchain 204b.

The controller 202c provides the recommendation request received from the requested user, the verified input (the latest recommendation) for the received recommendation request and the associated RPs (issued to the at least one user who has provided or bought the verified input/latest recommendation), and so on to the recommendation engine 106 for providing the recommendation(s) to the requested user.

As depicted in FIG. 2c, the blockchain networking system 204 includes the plurality of computing nodes 204a, and the blockchain 204b for performing the verification process to check if the at least one user who has provided the input is the approved legitimate user and if the corresponding inputs are the unbiased inputs.

Each of the computing nodes 204a can include at least one of, but not limited to, processors, multiple homogenous cores, multiple heterogeneous cores, multiple Central Processing Unit (CPUs) of different kinds, microprocessors, accelerators, and so on. Each of the computing nodes 204a can maintain the user details/service details associated with the users. The blockchain 204b can be a distributed public ledger (a decentralized database) comprising one or more blocks (block 0 . . . block N). In an embodiment herein, the one or more blocks can store the verified inputs (the latest recommendations), the verified RP-ID of the users, and so on. Each block of the blockchain 204b has a header and a known Merkle root, wherein the header may include a hash of a prior block in the blockchain 204b. Thus, the header may link the two blocks of the blockchain 204b. Each block in the blockchain may also have a body of the block that contains the transactions associated with that particular block. The linked blocks form a chain, with only one (successor) block allowed to link to one other (predecessor) block.

The at least one of computing nodes 204a can be configured to receive the input(s) and the RP-ID of the at least one corresponding user from the controller 202c of the verification and reward issuance engine 104. The at least one computing node 204a distributes the received inputs and the RP-ID of the at least one corresponding user to the other computing nodes of the blockchain networking system 204. In an embodiment, each computing node 204a may perform the POU method/mining process to verify the received input and verify if the at least one user who has provided the input is the approved legitimate user. Embodiments herein use the terms such as "POU", "proof of work", "mining process", "hash operation process", and so on interchangeably to refer to a method/process used for verifying the trustworthiness of the at least one user, who has provided the recommendations.

For verifying the at least one user, and the associated input, each computing node 204a checks the RP-ID associated with the at least one user using the decrypted data. In an embodiment, each computing node 204a may generate the decrypted data using the RSA method. In an example herein, each computing node 204a may generate the decrypted data L using the below equation:

$$L=(c^d) \bmod n$$

wherein, c is the encrypted data/RP-ID, d is the private key, and n is the product of the (p−1), and (q−1). If the decrypted data L matches with the user details/service details associated with the at least one user, then each computing node 204a accepts the received at least one input from the user by considering that the at least one user is a legitimate user. If the decrypted data L does not match with the user details/service details associated with the at least one user, then each computing node 204a rejects the received at least one input from the at least one user by considering that the at least one user is not a legitimate user.

Each computing node 204a may send results of the verifications (accept/reject) to the controller 202c of the computing device 202, wherein the controller 202c may accept/reject the input based on the results of the verification. The at least one computing node 204a may receive instructions from the controller 202c to store the input in the blocks of the blockchain, once the input is accepted by the controller 202c.

FIGS. 2a-2c show exemplary units of the verification and reward issuance engine 104, but it is to be understood that other embodiments are not limited thereon. In other embodiments, the verification and reward issuance engine 104 may include less or more number of units. Further, the labels or names of the units are used only for illustrative purpose and does not limit the scope of the embodiments herein. One or more units can be combined together to perform same or substantially similar function in the verification and reward issuance engine 104.

Figure 3A:
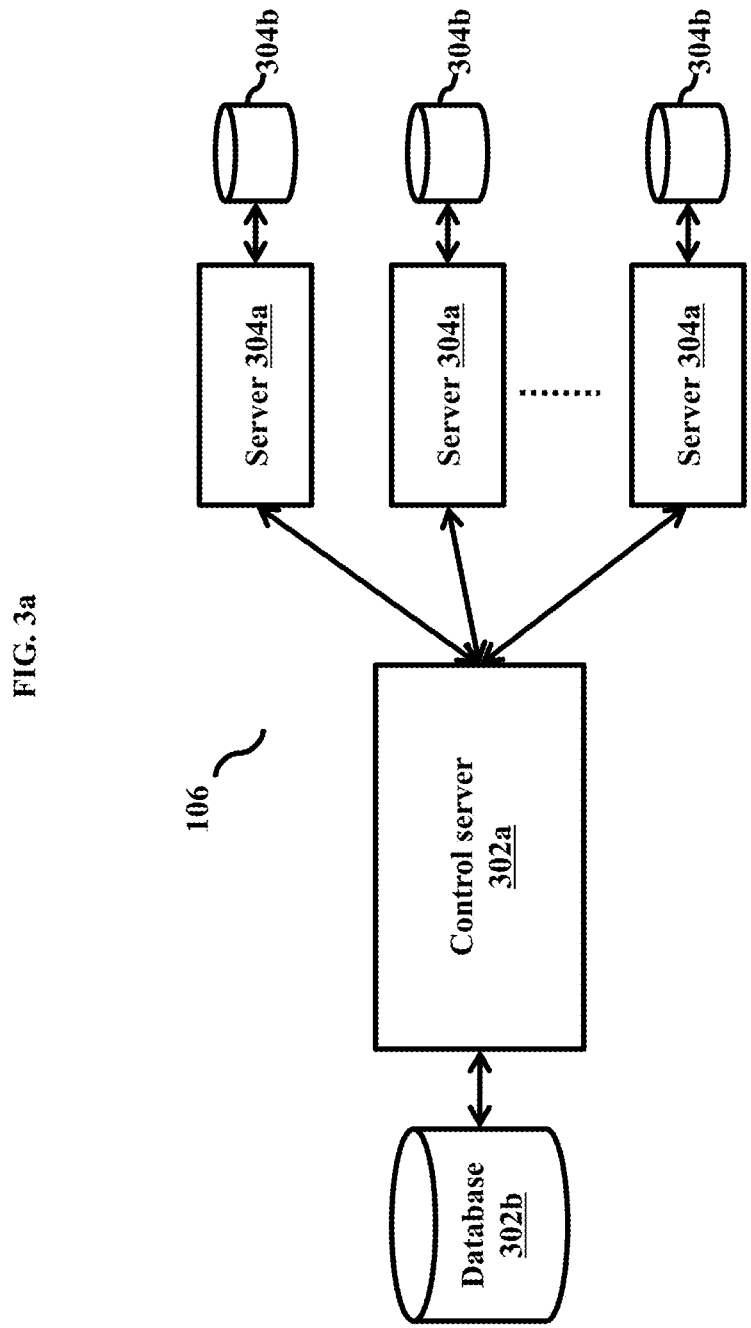
FIG. 3a depicts a recommendation engine of the recommendation system, according to embodiments as disclosed herein.

FIG. 3a depicts the recommendation engine 106, according to embodiments as disclosed herein. The recommendation engine 106 includes a control server 302a, and a plurality of distributed servers 304a. The control server 302a and the plurality of distributed servers 304a can be at least one of a cloud computing device (can be a part of a public cloud or a private cloud), a server (a standalone server, or a server on a cloud, or the like), a computing device, and so on. The computing device can be, but not limited to, a personal computer, a notebook, a tablet, desktop computer, a laptop, a handheld device a mobile device, and so on.

Each of the distributed servers 304a can include a database 304b for storing the recommendations and the associated recommendation details. The recommendation details can include information such as, but not limited to, the RP-IDs of the users, who have provided/bought the recommendations, the RPs associated with the RP-IDs of the users, who have provided/bought the recommendations, a frequency of the recommendations, a cost of the recommendations, availability of the recommendations, date of the recommendations, and so on. In an embodiment, the distributed servers 304a can be organized/positioned across the multiple tiers of recommendations (for example, the primary tier, the secondary tier, the tertiary tier, or the like), for indicating the priority of the recommendations included in each distributed server 304a. For example, the recommendations included in the distributed server 304a positioned at the primary tier may have the highest priority, and the recommendations included in the distributed server 304a positioned at the tertiary tier may have the lowest priority.

The control server 302a can include the database 302b, which can be used to store the user details and the service details registered by the users with verification and reward issuance engine 104 during the registration process, the verified inputs received from the verification and reward issuance engine 104, the recommendations provided for each recommendation request and the associated recommendation details (such as the RPs, the RP-ID of the users, the frequency of recommendations, and so on). The control server 302a can also communicate with the verification and reward issuance engine 104 in real-time or at pre-defined intervals or an occurrence of at least one event, and so on for receiving modified information. The modified information can include information about any change in at least one of the user details, the service details (for example: the change in the description, the cost, the availability, the service provider, the description of at least one of the product, the services, the content, the media, the application, or the like), the change in the recommendations details associated with the recommendations (for example: the change in the RPs, the frequency of recommendations, the cost of recommendations, and so on. The control server 302a updates the database corresponding to the received modified information.

The control server 302a further maintains a tier-server-recommendations mapping, which can provide mapping of the recommendations with the distributed server 304a and the associated tier of recommendations. The control server 302a can be configured to manage the positions of the distributed servers 304b, the recommendations and the associated recommendation details included in the distributed servers 304a and so on based on the tier-server-recommendation mapping. The control server 302a enables the distributed servers 304a to store and update the recommendations and the associated recommendation details in its databases 304b based on the communication with the verification and reward issuance engine 104.

The control server 302a can also be configured to provide the recommendations to the requested user on receiving the recommendation request of the user from the verification and reward issuance engine 104. In an embodiment, the control server 302a can provide the recommendations using the verified input (the latest recommendation) received from the verification and reward issuance engine 104 and the recommendations maintained in the distributed servers 304a.

In an embodiment, the at least one distributed server 304a can act as the control server 302a and perform the intended functions of the control server 302a.

Figure 3B:
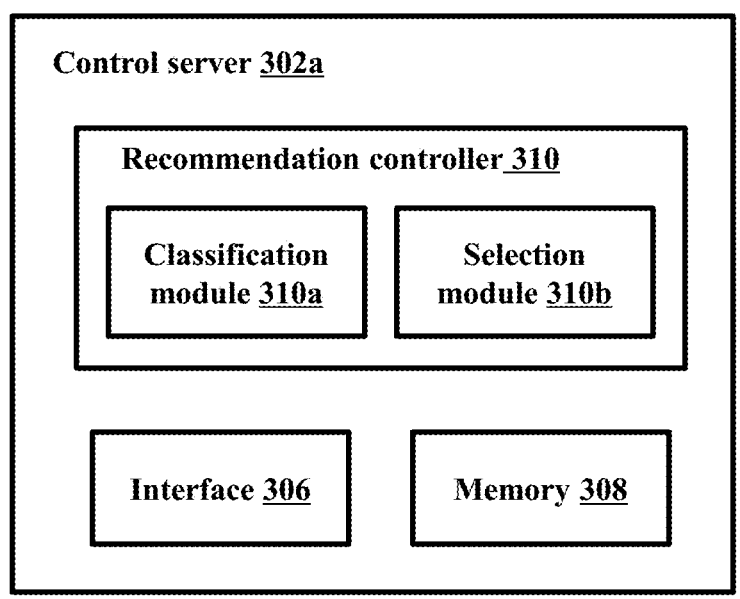
FIG. 3b is a block diagram depicting various components of a control server of the recommendation engine for providing recommendations to a requested user.

As depicted in FIG. 3b, the control server 302a includes an interface 306, a memory 308, and a recommendation controller 310. The control server 302a can also include at least one of a display, an Input/Output (I/O) modules, communication ports, and so on (not shown). The interface 306 can be configured to enable the control server 302a to communicate with at least one external entity (for example: the user devices 102, the verification and reward issuance engine 104, the distributed servers 304a, or the like) using the communication network. The memory 308 can store at least one of the recommendations, the recommendation details, and so on. In an embodiment herein, the memory 308 can be an expandable memory connected to the security device via a memory slot. Examples of the memory can be, but not limited to, NAND, embedded Multi Media Card (eMMC), Secure Digital (SD) cards, Universal Serial Bus (USB), Serial Advanced Technology Attachment (SATA), solid-state drive (SSD), and so on. Further, the memory 308 may include one or more computer-readable storage media. The memory 308 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 308 may, in some examples, be considered a non-transitory storage medium. The term "non-transitory" may indicate that the storage medium is not embodied in a carrier wave or a propagated signal. However, the term "non-transitory" should not be interpreted to mean that the memory 308 is non-movable. In certain examples, a non-transitory storage medium may store data that can, over time, change (e.g., in Random Access Memory (RAM) or cache).

The recommendation controller 310 can be at least one of a single processor, a plurality of processors, multiple homogenous cores, multiple heterogeneous cores, multiple Central Processing Unit (CPUs) of different kinds, microprocessors, accelerators, and so on. The recommendation controller 310 can be configured to provide the recommendations to the user, who has requested for the recommendations. The recommendation controller 310 can provide the recommendations to the user by receiving and classifying the verified input from the verification and reward issuance engine 104 into the at least one distributed server 304b positioned across the at least tier of recommendations, and selecting the recommendations from the distributed server 304a positioned at the tier having the highest priority.

The recommendation controller 310 uses a classification module 310a, and a selection module 310b for providing the recommendations to the requested user. In an embodiment, the classification module 310a and the decision module 310b can be at least one of a supervised machine learning model, a neural network model, a deep learning model, an Artificial Intelligence (AI) model, or any other machine learning models. The classification module 310a and the selection module 310b can be configured or trained using the previous recommendations and the associated recommendation details. The previous recommendations and the associated recommendation details may act as a dataset for the classification module 310a, and the selection module 310b. Based on such dataset, the classification module 310a, and the selection module 310b can generate optimized parameter values, wherein the optimized parameter values can be used to provide the recommendations to the requested user.

The recommendation controller 310 receives the recommendation request of the user, the verified input (the latest recommendation) and the associated RPs (corresponding to the recommendation request of the user) from the verification and reward issuance engine 104, and feeds the received verified input and the associated RPs to the classification module 310a. On receiving the verified inputs, the classification module 310a checks if the any of the distributed servers 304a includes the recommendations corresponding to the received verified input. If any of the distributed servers 304a does not include the recommendations corresponding to the received verified input, the classification module 304 determines the tier of recommendations having the lowest priority for the received verified input and enables the distributed server 304a positioned at the determined tier for storing the received verified input, and the associated RPs in its database 304b.

If any of the distributed servers 304a includes the recommendations corresponding to the received verified input, the classification module 310a uses the tier-server-recommendations mapping and determines the tier of recommendations on which the corresponding distributed server 304a is positioned. The classification module 310a further determines that the tier associated with the corresponding distributed server 304a as the current tier for the received verified input. The classification module 310a compares the RPs associated with the received verified input with the RP threshold criteria associated with the determined current tier and determines the updated tier for the received verified input. The classification module 310a determines the succeeding tier of the current tier as the updated tier for the received verified input if the associated RPs are greater than the RP threshold criteria associated with the current tier. The classification module 310a determines the preceding tier of the current tier as the updated tier for the received verified input if the associated RPs are lesser than the RP threshold criteria associated with the current tier. The classification module 310a determines the current tier as the updated tier if the associated RPs are equal to (or in the range of) the threshold criteria associated with the current tier. Once the updated tier for the received verified input is determined, the classification module 310a enables the distributed server 304a of the current tier to transfer/move the recommendations corresponding to the received verified input to the distributed server 304a of the updated tier, if the updated tier is the succeeding tier or preceding tier of the current tier. The classification module 310a does not transfer the recommendations corresponding to the received verified input to anywhere, if the updated tier is the same current tier. The classification module 310a further updates the tier-server-recommendation mapping with the updated tier of recommendations.

The recommendation controller 310 feeds the received recommendation request of the user (that is received from the verification and reward issuance engine) to the selection module 310b after updating the recommendations based on the received verified input (the latest recommendation) and the associated RPs. The selection module 310b selects the recommendations from the recommendations included in the distributed server 304a positioned at the tier of recommendations having the highest priority, then from the succeeding tiers, and communicates the selected recommendations to the requested user. Thereby, providing the reliable and relevant recommendations to the requested user based on the verified unbiased inputs. The selection module 310b can select the recommendation based on the received recommendation request, the recommendation details associated with the recommendations, and so on.

After providing the recommendations to the requested user, the recommendation controller 310 updates the recommendation details (for example: the frequency of recommendations) associated with the corresponding recommendations. The recommendation controller 310 stores the updated recommendation details in its database 302b. Further, the recommendation controller 310 enables the distributed server 304a including the corresponding recommendations to update the associated recommendation details. The recommendation controller 310 also communicates the recommendations provided to the requested user and the associated updated recommendation details to the verification and reward issuance engine 104 that may modify the RPs associated with the corresponding provided recommendation.

FIGS. 3a and 3b show exemplary units of the recommendation engine 106, but it is to be understood that other embodiments are not limited thereon. In other embodiments, the recommendation engine 106 may include less or more number of units. Further, the labels or names of the units are used only for illustrative purpose and does not limit the scope of the embodiments herein. One or more units can be combined together to perform same or substantially similar function in the recommendation engine 106.

Figure 4:
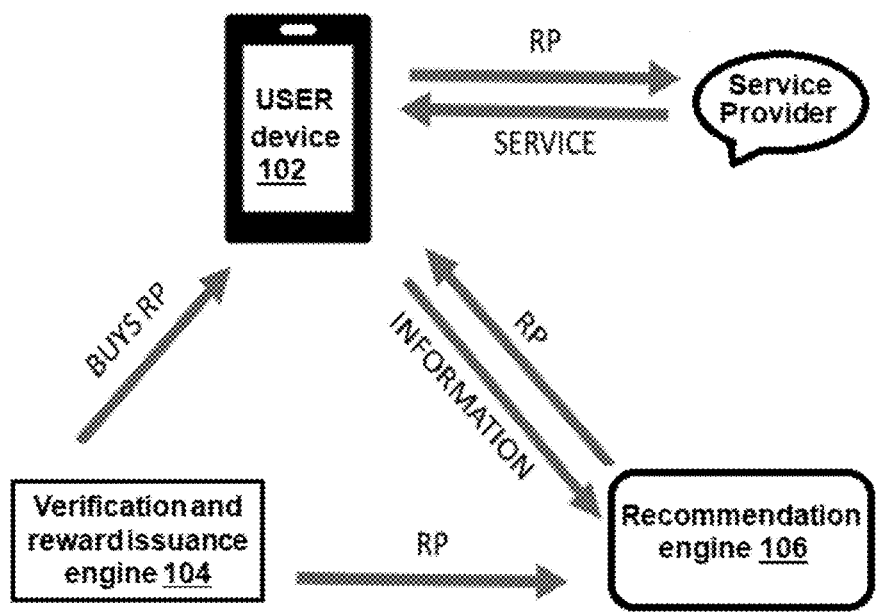
FIG. 4 is an example diagram depicting issuance of reward points (RPs) to the users, according to embodiments as disclosed herein.

FIG. 4 is an example diagram depicting issuance of the RPs to the users, according to embodiments as disclosed herein. Embodiments herein enable the verification and reward issuance engine 104 to issue the RP-IDs and the RPs to the users. The verification and reward issuance engine 104 issues the RP-IDs as the unique IDs for the user during the registration that allow the users to manage their data and transactions in the recommendation system 100. The verification and reward issuance engine 104 issues the RPs to the RP-IDs of the users as an incentive, which enables the users to involve in the information exchange. The users can use the RPs for obtaining at least one of the product, the service, the content, the media, and so on from the at least one service provider. The RPs can also build the trust in the users for their recommendations and in the service providers for their service. For example, if the service providers/users have more RPs, then it implies that there is most trust in their service.

The verification and reward issuance engine 104 issues the RPs to the RP-IDs of the users, when:
- the inputs provided by the corresponding users have accepted/verified and stored in the blockchain 204*b*;
- the corresponding users have bought the verified inputs (i.e. the users have included in the verified recommendations);
- the inputs provided by the users are provided as the recommendations to the requested user/customer; and
- the recommendations corresponding to the verified inputs of the corresponding users are included in the distributed servers 304*a* of the higher tiers;

Embodiments herein further enable the verification and reward issuance engine 104 to increase or decrease the RPs from the RP-IDs of the users based on at least one of:
- the transactions between the users (for example; between the customers, between the service providers, and between the customers and the service providers);
- the storage or removal of the recommendations corresponding to the inputs of the users from the distributed servers 304*a* positioned across the multiple tiers of recommendations;
- the updating of the recommendations corresponding to the inputs of the users across the multiple tiers of recommendations, which have provided or bought by the users; and
- the storage or removal of the recommendations corresponding to the inputs of the users in or from the blockchain 204*b*.

FIG. 5 is an example diagram depicting verification of the inputs received from the at least one registered user, according to embodiments as disclosed herein. Embodiments herein the verification and reward issuance engine 104 to receive the recommendation(s) from the at least one registered user and verify the received recommendation(s) and trustworthiness of the associated at least on user using the blockchain networking system 204.

The verification and reward issuance engine 104 receives the recommendation request from the user/customer (for example: a user A) for the recommendation(s) of at least one of the product, the service, the content, the media, and so on, in which the user may be interested. The verification and reward issuance engine 104 broadcasts the received recommendation request to the all the registered users (for example: a user B-a user N). In response to the recommendation request, the at least one registered user (for example: the user C) may communicate the input and the associated RP-ID to the verification and reward issuance engine 104.

On receiving the input and the RP-ID of the user C, the verification and reward issuance engine 104 enables the blockchain networking system 204 to verify if the user C is the registered user/approved legitimate user based on the associated RP-ID and if the input provided by the user C is unbiased input/valid recommendation. In the blockchain networking system 204, the received recommendation and the RP-ID of the user C may be provided to all the computing nodes 204*a*. The computing nodes 204*a* can verify if the user C is the approved legitimate user based on the associated RP-ID and if the input provided by the user C is unbiased input/valid recommendation using the POU method. If more than the pre-defined number of computing nodes (for example: if more than 50% of the computing nodes) verifies that the user C is the approved legitimate user and the input received from the user C is the unbiased input, then the verification and reward issuance engine 104 accepts the input as the verified input (the latest recommendation) and stores the RP-ID of the user C and the verified input in the blocks of the blockchain 204*b*. The verification and reward issuance engine 104 further provides the verified input (i.e stored in the blockchain 204*b*) as the latest recommendation to the recommendation engine 106, wherein the recommendation engine 106 uses the verified input and the maintained previous recommendation and the associated details for providing the recommendation to the user A, who has requested for the recommendation.

Figure 6A:
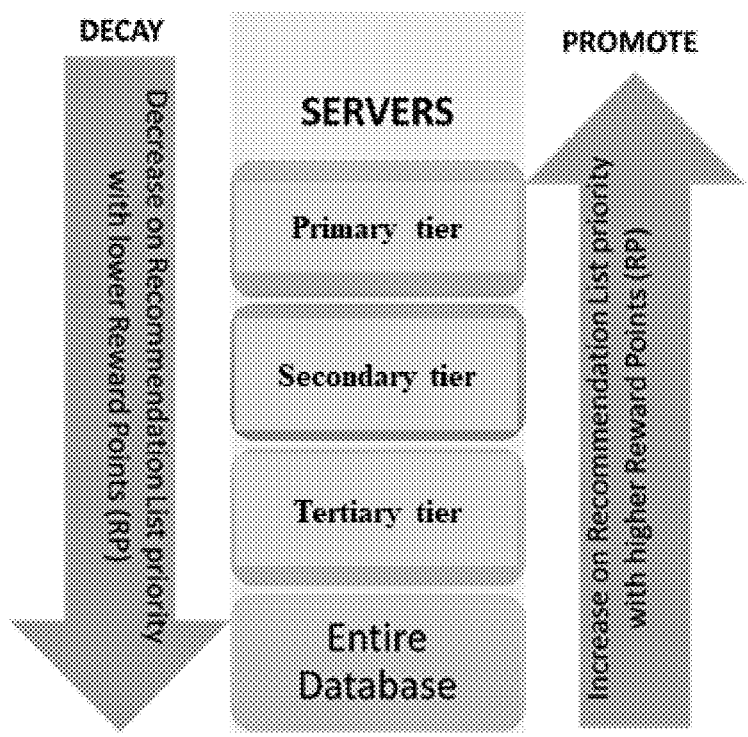
FIG. 6a depicts the recommendation engine maintaining previous recommendations and associated recommendation details, according to embodiments as disclosed herein.

FIG. 6*a* depicts the recommendation engine 106 maintaining the previous recommendations and the associated recommendation details, according to embodiments as disclosed herein. The recommendation engine 106 includes the control server 302*a* coupled with the database 302*b*, and the plurality of distributed servers 304*a* coupled with the databases 304*b*. The control server 302*a* can store the user details, the service provider details and the service details provided by the service providers during the registration and the plurality of recommendations provided to each recommendation request in its database 302*b*. The control server 302*a* further manages the plurality of distributed servers 304*a* distributed across the multiple tiers/segments of recommendations. In an example herein, the distributed servers 304*a* can be distributed across at least one of the primary tier, the secondary tier, and the tertiary tier. The control server 302*a* may enable the distributed serves for storing the previous recommendations and the associated recommendation details in their databases 304*b* according to the RPs associated with the previous recommendations and the RP threshold criteria associated with its positioned tier of recommendations. The tier of recommendations associated with the distributed server 304*a* can indicate the priority of the recommendations included in the corresponding server. For example, the recommendations stored in the distributed server 304*a* of the primary tier may have the highest priority, and the recommendations stored in the distributed server 304*a* of the tertiary server may have the lowest priority.

Figure 6B:
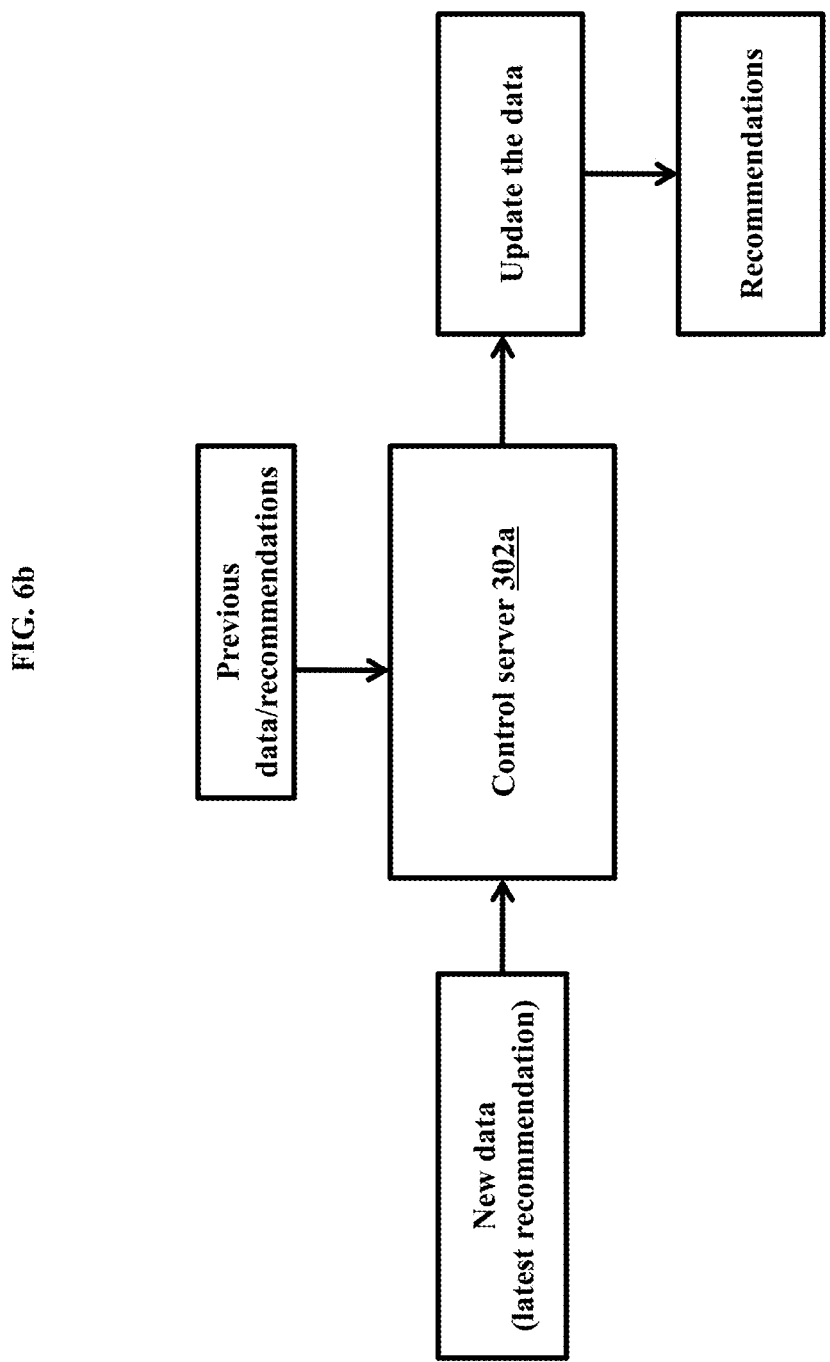
FIG. 6b is an example diagram depicting a process of providing the recommendations to the requested user, according to embodiments as disclosed herein.

FIG. 6*b* is an example diagram depicting a process of providing the recommendations to the requested user, according to embodiments as disclosed herein. Embodiments herein enable the control server 302*a* of the recommendation engine 106 to provide the recommendations to the user using the verified inputs and the maintained previous recommendations. The control server 302*a* receives the recommendation request of the user, and the verified inputs and the associated RPs related to the received recommendation request from the verification and reward issuance engine 104. The control server 302*a* checks if the recommendations corresponding to the received verified inputs are included in any one of the distributed servers 304*a* positioned across the multiple tiers of recommendations. If the recommendations corresponding to the received verified inputs are not included in any one of the distributed servers 304*a* positioned across the multiple tiers of recommendations, the control server 302*a* adds the verified inputs as the recommendations in the distributed server 304*a* of the tertiary tier.

If the recommendations corresponding to the received verified inputs are included in any one of the distributed servers 304*a* positioned across the multiple tiers of recommendations, the control server 302*a* determines the tier of recommendations associated with the corresponding distributed server 304*a* as the current tier for the received verified inputs. The control server 302*a* then compares the RPs of the received verified inputs with the RP threshold criteria associated with the determined current tier and determines the updated tier for the received verified recommendations. The control server 302a then promotes/demotes the recommendations corresponding to the received verified inputs by moving the corresponding recommendations to the distributed server 304a of the updated tier.

Consider an example scenario, wherein the control server 302a receives the verified inputs having 32 RPs and determines that the distributed server 304a of the secondary tier includes the recommendations corresponding to the verified inputs. In such a scenario, the control server 302a compares the RPs associated with the verified inputs (32 RPs) with the RP threshold criteria of the second tier (in an example herein, the RP threshold criteria may be 5-30). The control server 302a determines the primary tier as the updated tier for the received verified inputs, as the RPs of the associated verified inputs (32 RPs) is greater than the RP threshold criteria of the second tier (5-30). The control server 302a then promotes the recommendations corresponding to the verified inputs to the distributed server 304a of the primary tier.

Consider an example scenario, wherein the control server 302a receives the verified inputs having 4 RPs and determines that the distributed server 304a of the secondary tier includes the recommendations corresponding to the verified inputs. In such a scenario, the control server 302a compares the RPs associated with the verified inputs (4 RPs) with the RP threshold criteria of the second tier (in an example herein, the RP threshold criteria may be 5-30). The control server 302a determines the tertiary tier as the updated tier for the received verified inputs, as the RPs of the associated verified inputs (4 RPs) is lesser than the RP threshold criteria of the second tier (5-30). The control server 302a then promotes the recommendations corresponding to the verified inputs to the distributed server 304a of the primary tier.

Consider an example scenario, wherein the control server 302a receives the verified inputs having 50 RPs and determines that the distributed server 304a of the primary tier includes the recommendations corresponding to the verified inputs. In such a scenario, the control server 302a compares the RPs associated with the verified inputs (50 RPs) with the RP threshold criteria of the primary tier (in an example herein, the RP threshold criteria may be above 50). The control server 302a determines the primary tier itself as the updated tier for the received verified inputs, as the RPs of the associated verified inputs (4 RPs) is in the range of the RP threshold criteria of the primary tier (above 30).

On promoting or demoting the recommendations, the control server 302a selects the relevant recommendation from the recommendations included in the distributed server 304a of the primary tier based on the associated recommendation details and communicates the selected relevant recommendation to the requested user.

Figure 7:
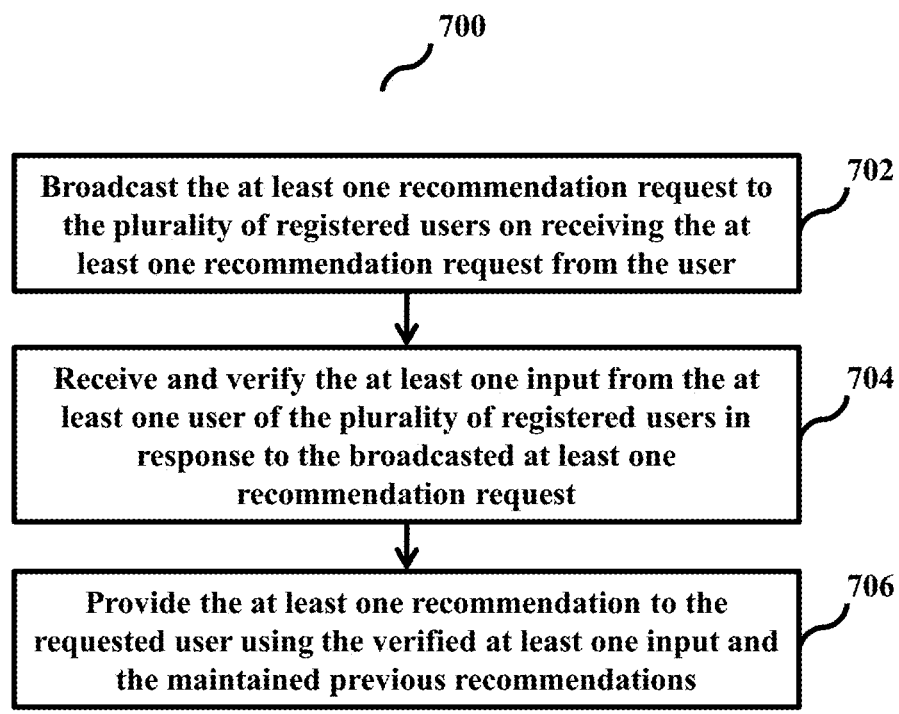
FIG. 7 is a flow diagram depicting a method for providing the reward based verified recommendations to the requested user, according to embodiments as disclosed herein.

FIG. 7 is a flow diagram 700 depicting a method for providing the reward based verified recommendations to the requested user, according to embodiments as disclosed herein. At step 702, the method includes broadcasting, by the verification and reward issuance engine 104, the at least one recommendation request to the plurality of registered users (the plurality of second users), on receiving the at least one recommendation request from the user (the first user).

At step 704, the method includes receiving and verifying, by the verification and reward issuance engine 104, the at least one input from the at least one user of the plurality of registered users in response to the broadcasted at least one recommendation request. The inputs can be related to the recommendation request and can include at least one of the at least one service provider (the third user) and the services provided by the at least one service provider.

At step 706, the method includes providing, by the recommendation engine 106, the at least one recommendation to the requested user using the verified at least one input and the maintained previous recommendations. The various actions in method 700 may be performed in the order presented, in a different order or simultaneously. Further, in some embodiments, some actions listed in FIG. 7 may be omitted.

Figure 8:
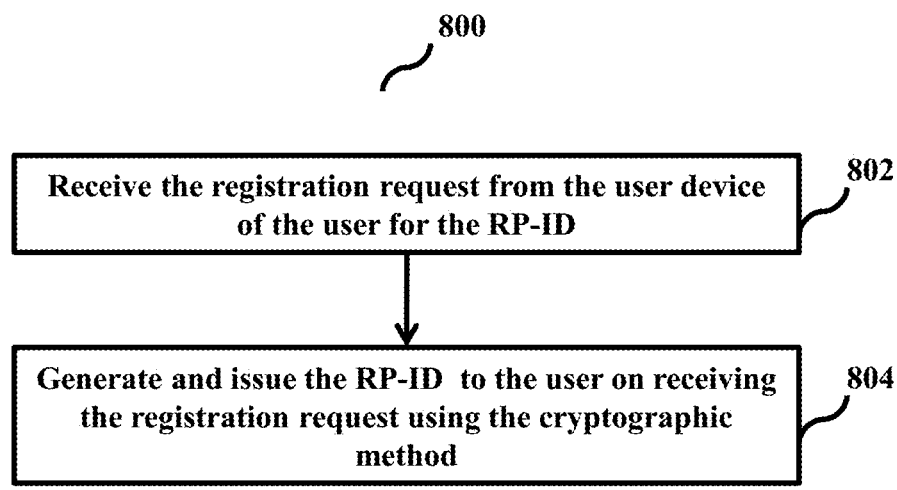
FIG. 8 is flow diagram depicting a method for issuing the RP-IDs to the users, according to embodiments as disclosed herein.

FIG. 8 is flow diagram 800 depicting a method for issuing the RP-IDs to the users, according to embodiments as disclosed herein. At step 801, the verification and reward issuance engine 104 receives the registration request from the user device 102 of the user for the RP-ID, wherein the registration request includes the user details and/or the service details. The RP-ID can be used by the user for registering their service details, receiving the recommendations, providing the inputs, and so on. At step 802, the verification and reward issuance engine 104 generates and issues the RP-ID to the user on receiving the registration request. The verification and reward issuance engine 104 applies the at least one cryptography method on the received user details and/or service details and generates the RP-ID which can be the unique identification for the user. The RP-ID can be the encrypted data generated using the plain-id, and the public keys generated for the user. The verification and reward issuance engine 104 communicates the generated RP-ID to the user device 102 of the user in response to the received registration request. The various actions in method 800 may be performed in the order presented, in a different order or simultaneously. Further, in some embodiments, some actions listed in FIG. 8 may be omitted.

Figure 9:
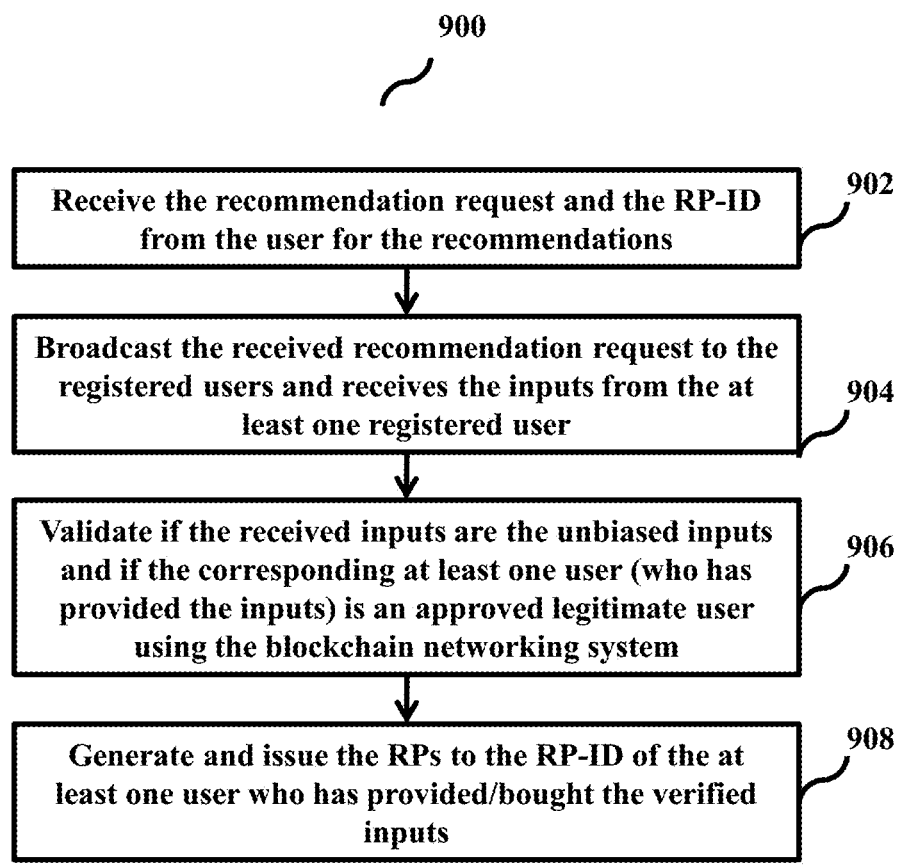
FIG. 9 is a flow diagram depicting a method for verifying the inputs received from the at least one user and issuing the RPs to the at least one user, according to embodiments as disclosed herein.

FIG. 9 is a flow diagram 900 depicting a method for verifying the inputs received from the at least one user and issuing the RPs to the at least one user, according to embodiments as disclosed herein. At step 902, the verification and reward issuance engine 104 receives the recommendation request and the RP-ID from the user for the recommendations. The recommendations can be recommending at least one of the product, the service/service provider, the content, the media, and so on. At step 904, the verification and reward issuance engine 104 broadcasts the received recommendation request to the registered users and receives the inputs from the at least one registered user.

At step 906, the verification and reward issuance engine 104 validates if the received inputs are the unbiased inputs and if the corresponding at least one user (who has provided the inputs) is an approved legitimate user using the blockchain networking system 204. The verification and reward issuance engine 104 provides the inputs and the RP-ID of the at least one user, who has provided the inputs to the computing nodes 204a of the blockchain networking system 204. The computing nodes 204a validates if the at least one user who has provided the inputs is the approved legitimate user and if the inputs are the unbiased inputs and sends the results of the validation to the verification and reward issuance engine 104. The verification and reward issuance engine 104 determines if the number of computing nodes 204a who have validated the inputs and the corresponding at least one user is greater than the pre-defined threshold. If the number of computing nodes 204a who have validated the inputs and the corresponding at least one user is greater than the pre-defined threshold, the verification and reward issuance engine 104 accepts the received inputs as the verified inputs and stores the validated inputs as the latest recommendation and the RP-ID of the at least one user in the blockchain 204b.

At step 908, the verification and reward issuance engine 104 generates and issues the RPs to the RP-ID of the at least one user who has provided/bought the verified inputs. The verification and reward issuance engine 104 can generate the RPs using factors such as, but not limited to, frequency of the verified input/latest recommendation, a number of conversions of the verified input into the recommendations, the RPs already associated with the RP-ID of the users, who have provided/bought the verified input/latest recommendation, cost of the verified input/latest recommendation, position of the verified input/recommendation on the blockchain 204b/recommendation engine 106, and so on. The verification and reward issuance engine 104 provides the received recommendation request, the verified inputs and the associated RPs (i.e. the RPs issued to the at least one user, who has provided/bought the verified inputs) to the recommendation engine 106 for providing the recommendations to the requested user. The various actions in method 900 may be performed in the order presented, in a different order or simultaneously. Further, in some embodiments, some actions listed in FIG. 9 may be omitted.

Figure 10:
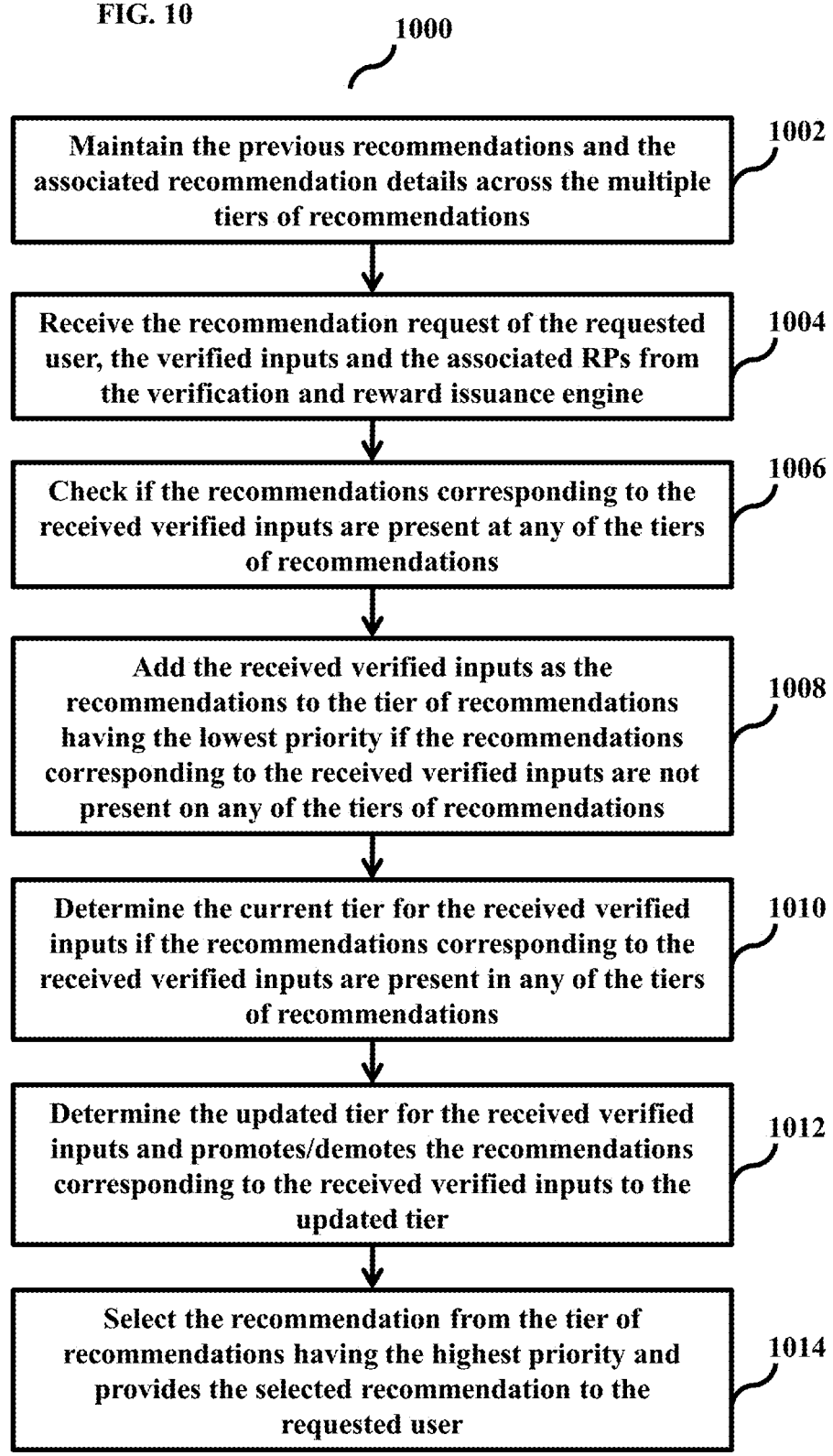
FIG. 10 is a flow diagram depicting a method for providing the recommendations to the requested user using the verified inputs and the maintained previous recommendations, according to embodiments as disclosed herein.

FIG. 10 is a flow diagram 1000 depicting a method for providing the recommendations to the requested user using the verified inputs and the maintained previous recommendations, according to embodiments as disclosed herein. At step 1002, the recommendation engine 106 maintains the previous recommendations and the associated recommendation details across the multiple tiers of recommendations.

At step 1004, the recommendation engine 106 receives the recommendation request of the requested user, the verified inputs and the associated RPs (i.e. the RPs issued to the at least one user, who has provided/bought the verified inputs) from the verification and reward issuance engine 104.

At step 1006, the recommendation engine 106 checks if the recommendations corresponding to the received verified inputs are present at any of the tiers of recommendations. At step 1008, the recommendation engine 106 adds the received verified inputs as the recommendations to the tier of recommendations having the lowest priority if the recommendations corresponding to the received verified inputs are not present on any of the tiers of recommendations.

At step 1010, the recommendation engine 106 determines the current tier for the received verified inputs if the recommendations corresponding to the received verified inputs are present in any of the tiers of recommendations.

At step 1012, the recommendation engine 106 determines the updated tier for the received verified inputs and promotes/demotes the recommendations corresponding to the received verified inputs to the updated tier. The recommendation engine 106 can determine the updated tier for the received verified inputs based on the associated RPs, and the threshold criteria associated with the current tier of recommendations.

At step 1014, the recommendation engine 106 selects the recommendation from the tier of recommendations having the highest priority and provides the selected recommendation to the requested user. The recommendation engine 106 selects the recommendation based on the recommendation request and the associated recommendation details. The various actions in method 1000 may be performed in the order presented, in a different order or simultaneously. Further, in some embodiments, some actions listed in FIG. 10 may be omitted.

Figure 11:
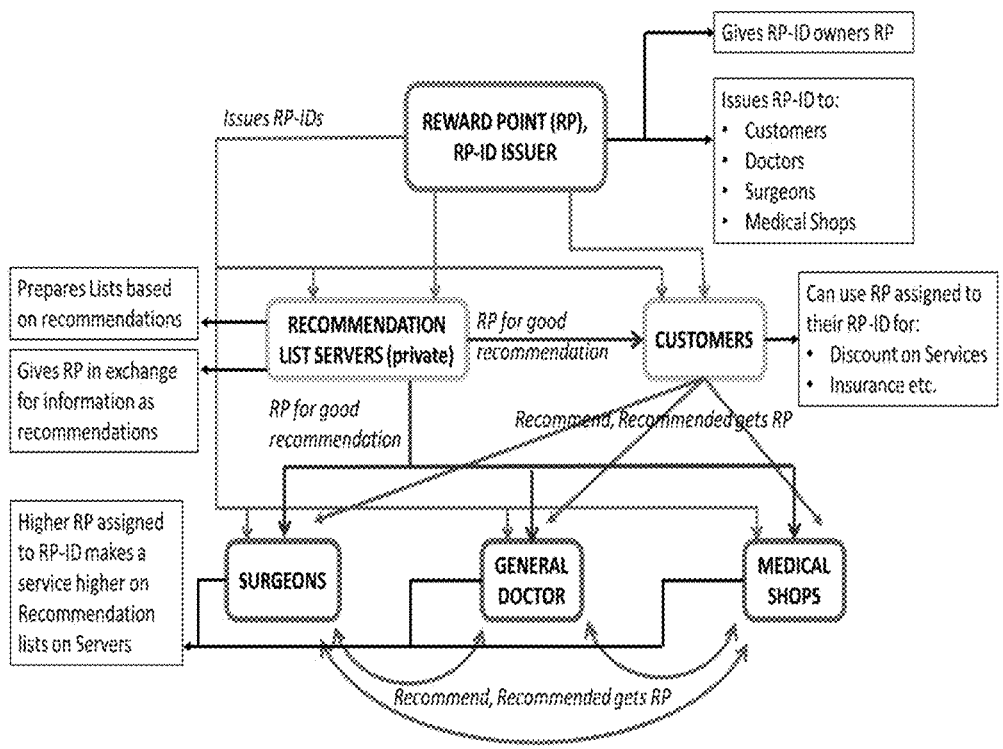
FIG. 11 depicts an example use-case scenario of providing the recommendation related to the medical field, according to embodiments as disclosed herein.

FIG. 11 depicts an example use-case scenario of providing the recommendation related to the medical field, according to embodiments as disclosed herein. Consider an example herein, wherein the users register with the verification and reward issuance engine 104 for registering the service details, receiving the recommendations related to the medical field, providing the inputs relate to the medical field, and so on. The users include the customer, who wishes to receive the recommendations related to the medical field, the service providers who provide the services to the medical field, and the other customer and/or the other service provider (hereinafter referred as the users), who can provide the inputs related to the medical field, and so on. In an example herein, the service provider can be at least one of general doctors/surgeons, hospitals/clinics, medical shops, or the like providing at least one of service/treatment, medicines, and so on. The verification and reward issuance engine 104 provides the unique RP-IDs to customer, the users, and the service providers (for example: the doctors/surgeons, the hospitals/clinics, the medical shops, or the like).

On receiving the RP-ID, the customer sends the recommendation request to the verification and reward issuance engine 104 for the recommendations, when the customers want to know about the general doctors to visit. The recommendation request includes the RP-ID of the customer, and the query specifying the general doctors. The verification and reward issuance engine 104 broadcasts the received recommendation request to the registered users and the at least one user may respond to the received recommendation request by providing the inputs related to the general doctors. In an example herein, the inputs may include at least one of recommending the particular general doctor, providing the information/feedback about the general doctor, and so on. The verification and reward issuance engine 104 verifies the received inputs and trustworthiness of the at least one user, who has responded with the inputs using the block chain 204b. Once the received inputs and trustworthiness of the at least one user are verified, the verification and reward issuance engine 104 accepts the inputs as the latest verified recommendation and stores the received verified inputs in the blockchain 204b. The verification and reward issuance engine 104 further issues the RPs to the RP-ID of the at least one user who has responded with the verified inputs, and to the RP-ID of the general doctor, who has included in the verified inputs. In an example herein, the verification and reward issuance engine 104 issues the RPs based on the factors such as, but not limited to, the frequency of recommendations provided to the requested customer, which correspond to the general doctor specified in the verified inputs, the position of the recommendations corresponding to the general doctor of the verified inputs in the recommendation engine 106, the current RPs of the at least one user, who has provided the verified inputs, and the general doctor, who has included in the verified inputs, and so on. The verification and reward issuance engine 104 provides the recommendation request received from the customer, the verified inputs (the latest recommendation) and the associated RPs (i.e. the RPs issued to the at least one user, who has provided the verified inputs and to the general doctor, who has included in the verified inputs) to the recommendation engine 106.

The recommendation engine 106 compares the received verified inputs including the general doctor with the recommendations (for example: the recommendations may include the plurality of general doctors and the associated recommendation details) stored across the multiple tiers. If any of the general doctors stored across the multiple tier matches with the general doctor specified in the verified input, the recommendation engine 106 determines the current tier of the associated general doctor as the current tier for the received verified general doctor. The recommendation engine 106 further compares the RPs of the verified general doctor and the at least one user (associated with the verified input) with the RP threshold criteria of the current tier of recommendations and determines the updated tier for the general doctor. The recommendation engine 106 promotes/demotes the general doctor and the corresponding recommendation details from the current tier to the updated tier. Thereafter, the recommendation engine 106 may select the general doctor from the plurality of general doctors positioned at the tier of having the highest priority and provide the selected general doctor as the recommendation to the requested customer. Thus, the recommendations can be provided to the requested customer based on the multiple tiers of recommendations, that account for the multiple past recommendation requests and not only on the latest recommendation received for the current recommendation request, which further increases the reliability and relevancy of the recommendations.

After providing the recommendation to the requested user, the verification and reward issuance engine 104 modifies/increases the RPs issued to the RP-ID of the general doctor included in the recommendation and also to the RP-ID of the at least one user who has provided the verified input including the corresponding general doctor. The general doctor with the increased RPs may be moved up in the recommendation list/tier. The at least one user can use the RPs for the data and transactions in the recommendation system 100. In an example herein, the at least one user can use the RPs for better health insurance or buying inexpensive medical services or the like.

Embodiments herein provide recommendations to at least one user by building a smartly managed list of recommendations, incorporating a Blockchain consensus mechanism to get unbiased inputs and introducing Reward Points (RP) as an incentive and transaction unit.

Embodiments herein provide a decentralized reward-based recommendation system that uses Blockchain consensus mechanism to receive and verify inputs/recommendations from other users using a Proof of Work/User (POW/POU) method.

Embodiments herein maintain a list of recommendation, which accounts for the services and the frequency with the people recommend them.

Embodiments herein further issue Reward Point IDs (RP-IDs) as a unique ID to the users, who want to register with the recommendation system. The same RP-IDs can be used to enable a flow of Reward Points (RPs), which act as an incentive for the users to get involved in the information exchange. The RPs can be used to rate and provide the recommendations in the system. The RPs can also act as the currency of the system and can be bought and used for the data and transactions in the system.

The embodiments disclosed herein can be implemented through at least one software program running on at least one hardware device and performing network management functions to control the elements. The elements shown in FIGS. 1a-3b can be at least one of a hardware device, or a combination of hardware device and software module.

The embodiments herein disclose methods and systems for providing reward based verified recommendations. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in at least one embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments and examples, those skilled in the art will recognize that the embodiments and examples disclosed herein can be practiced with modification within the spirit and scope of the embodiments as described herein.

What is claimed is:

1. A method for providing recommendations, the method performed by a verification and reward issuance engine comprising a blockchain networking system and a computing device coupled to the blockchain networking system, the method comprising:
  broadcasting at least one recommendation request to a plurality of second users, on receiving the at least one recommendation request from at least one first user;
  receiving and verifying at least one input from at least one second user of the plurality of second users in response to the broadcasted at least one recommendation request, wherein the verifying at least one input received from the at least one second user includes:
  enabling a plurality of computing nodes of the blockchain networking system to verify the received at least one input and trustworthiness of the at least one second user from whom the at least one input is received, and
  checking if a number of computing nodes verified the received at least one input and trustworthiness of the at least one second user satisfies a threshold, wherein the threshold is varied dynamically based on the number of plurality of computing nodes in the blockchain networking system,
  wherein the plurality of computing nodes verifies the received at least one input and the trustworthiness of the at least one second user from whom the at least one input is received using a proof of work consensus method, wherein the verifying the received at least one input and the trustworthiness of the at least one second user from whom the at least one input is received includes:

generating decrypted data using the at least one RP-ID of the at least one second user;

checking if the decrypted data includes the user details associated with the at least one second user;

verifying that the at least one second user is not a legitimate user and rejecting the at least one input received from the at least one second user if the decrypted data does not include the user details associated with the at least one second user; and verifying that the at least one second user is a legitimate user, and accepting the at least one input received from the at least one user; and providing, by a recommendation engine coupled to the verification and reward issuance engine, at least one recommendation to the requested at least one first user using the verified at least one input and previous recommendations, wherein the providing, by the recommendation engine, the at least one recommendation includes:

maintaining a plurality of recommendations and associated recommendation details across multiple tiers of recommendations indicating priority for the plurality of recommendations, wherein the plurality of recommendations are the previous recommendations corresponding to previous recommendation requests;

receiving the at least one recommendation request of the at least one first user, and the at least one verified input corresponding to the received at least one recommendation request as at least one latest recommendation from the verification and reward issuance engine;

updating the plurality of recommendations and the associated recommendation details maintained across the multiple tiers of recommendations using the received at least one verified input; and providing the at least one recommendation to the requested at least one first user from the updated plurality of recommendations maintained across the multiple tiers of recommendations, and wherein the updating the plurality of recommendations maintained across the multiple tiers of recommendations includes:

determining if the received at least one verified input matches with at least one recommendation of the plurality of recommendations maintained across the multiple tiers of recommendations;

determining a tier of recommendations associated with the at least one recommendation if the corresponding at least one recommendation matches with the received at least one verified input;

identifying the determined tier of recommendations as a current tier for the received at least one verified input;

determining an updated tier for the received at least one verified input using the RPs associated with the at least one verified input, and a RP threshold criteria associated with the identified current tier, wherein the updated tier is at least one of a succeeding tier and a preceding tier of the current tier of recommendations, and the same current tier; and transferring the at least one recommendation matching the received at least one verified input from the current tier of recommendations to the updated tier of recommendations if the determined updated tier is at least one of the succeeding and preceding tiers of the current tier of recommendations.

2. The method of claim 1, wherein the received at least one input is related to the received at least one recommendation request, wherein the at least one input includes at least one of information about at least one third user and at least one service provided by the at least one third user.

3. The method of claim 1, further comprises:

receiving a registration request from the at least one first user, the plurality of second users, and the at least one third user; and generating at least one reward-point identifier (RP-ID) using a cryptographic method to the requested at least one first user, plurality of second users, and at least one third user for receiving the at least one recommendation, providing the at least one input, and registering at least one service detail respectively.

4. The method of claim 3, wherein generating the at least one RP-ID using the cryptographic method includes:

generating a plurality of public keys for the requested at least one of the at least one first user, the plurality of second users, and the at least one third user;

generating a plain identifier (plain_id) by converting user details associated with the requested at least one of the at least one first user, the plurality of second users, and the at least one third user into at least one number; and generating an encrypted data using the plurality of public keys, and the generated plain_id, wherein the generated encrypted data is the at least one RP-ID for the requested at least one of the at least one first user, the plurality of second users, and the at least one third user into at least one number.

5. The method of claim 1, wherein verifying the at least one input received from the at least one second user includes:

accepting the received at least one input as at least one verified input and storing the at least one verified input in blocks of a blockchain of the blockchain networking system if the number of computing nodes verified the received at least one input and trustworthiness of the at least one second user satisfies the threshold.

6. The method of claim 5, further comprises discarding the received at least one input if the number of computing nodes verified the received at least one input and trustworthiness of the at least one second user does not satisfy the threshold.

7. The method of claim 5, further comprises:

generating at least one reward point (RP) to at least one of the at least one second user from whom the at least one input is received and the at least one third user who is included in the received at least one input on verifying the received at least one input;

issuing the generated at least one RP to at least one of the at least one RP-ID of the at least one second user and the at least one RP-ID of the at least one third user; and communicating the received at least one recommendation request, the at least one verified input and RPs associated with the at least one verified input to the recommendation engine for providing the at least one recommendation, wherein the RPs associated with the at least one verified input refers to the at least one RP issued to the RP-ID of the at least one second user from whom the at least one verified input is received and to the RP-ID of the at least one third user who is included in the at least one verified input.

8. The method of claim 7, wherein the at least one RP is generated based on at least one factor including at least one of frequency of the at least one verified input, a number of conversions of the at least one verified input into the at least one recommendation, current reward points (RPs) associated with the at least one RP-ID of the at least one second user, and the at least one third user, cost of the at least one verified input, position of the at least one verified input on the blockchain and the recommendation engine.

9. The method of claim 1, further comprises:
adding the received at least one verified input as the at least one recommendation in the tier of recommendations with a lowest priority if the received at least one verified input does not match with the at least one recommendation of the plurality of recommendations maintained across the multiple tiers of recommendations.

10. The method of claim 1, wherein providing the at least one recommendation to the requested at least one first user from the updated the plurality of recommendations includes:
selecting the at least one recommendation from the plurality of recommendation maintained at the tier of recommendations with a highest priority based on the received at least one recommendation request, and the recommendation details associated with the plurality of recommendations; and
providing the selected at least one recommendation to the requested at least one first user.

11. The method of claim 10, further comprises:
updating the recommendation details of the at least one recommendation provided to the requested at least one first user across the multiple tiers of recommendations;
communicating the provided at least one recommendation and the updated at least one recommendation details to the verification and reward issuance engine, wherein the verification and reward issuance engine modifies the RPs associated with the provided at least one recommendation; and
changing a position of the provided at least one recommendation across the multiple tiers of recommendations on receiving the modified RPs associated with the provided at least one recommendation.

12. A recommendation system comprising:
a verification and reward issuance engine comprising:
a blockchain networking system; and
a computing device coupled to the blockchain networking system configured to:
broadcast at least one recommendation request to a plurality of second users, on receiving the at least one recommendation request from at least one first user; and
receive and verify at least one input from at least one second user of the plurality of second users in response to the broadcasted at least one recommendation request, wherein the computing device is further configured to:
enable a plurality of computing nodes of the blockchain networking system to verify the received at least one input and trustworthiness of the at least one second user from whom the at least one input is received,
check if a number of computing nodes verified the received at least one input and trustworthiness of the at least one second user satisfies a threshold, wherein the threshold is varied dynamically based on the number of plurality of computing nodes in the blockchain networking system, and
wherein the plurality of computing nodes is further configured to use a proof of work consensus method for verifying the received at least one input and trustworthiness of the at least one second user by:
generating decrypted data using the at least one RP-ID of the at least one second user;
checking if the decrypted data includes the user details associated with the at least one second user;
verifying that the at least one second user is not a legitimate user and rejecting the at least one input received from the at least one second user if the decrypted data does not include the user details associated with the at least one second user; and
verifying that the at least one second user is a legitimate user, and accepting the at least one input received from the at least one user; and
a recommendation engine communicatively coupled to the verification and reward issuance engine configured to:
provide at least one recommendation to the requested at least one first user using the verified at least one input and previous recommendations,
wherein the recommendation engine is further configured to:
maintain a plurality of recommendations and associated recommendation details across multiple tiers of recommendations indicating priority for the plurality of recommendations, wherein the plurality of recommendations are the previous recommendations corresponding to previous recommendation requests;
receive the at least one recommendation request of the at least one first user, and the at least one verified input corresponding to the received at least one recommendation request as at least one latest recommendation from the verification and reward issuance engine;
update the plurality of recommendations and the associated recommendation details maintained across the multiple tiers of recommendations using the received at least one verified input; and
provide the at least one recommendation to the requested at least one first user from the updated plurality of recommendations maintained across the multiple tiers of recommendations, and
wherein the recommendation engine is further configured to:
determine if the received at least one verified input matches with at least one recommendation of the plurality of recommendations maintained across the multiple tiers of recommendations;
determine a tier of recommendations associated with the at least one recommendation if the corresponding at least one recommendation matches with the received at least one verified input;
identify the determined tier of recommendations as a current tier for the received at least one verified input;
determine an updated tier for the received at least one verified input using the RPs associated with the at least one verified input, and a RP threshold criteria associated with the identified current tier, wherein the updated tier is at least one of a succeeding tier and a preceding tier of the current tier of recommendations, and the same current tier; and transfer the at least one recommendation matching the received at least one verified input from the current tier of recommendations to the updated tier of recommendations if the determined updated tier is at least one of the succeeding and preceding tiers of the current tier of recommendations.

13. The recommendation system of claim 12, wherein the received at least one input is related to the received at least one recommendation request, wherein the at least one input includes at least one of information about at least one third user and at least one service provided by the at least one third user.

14. The recommendation system of claim 12, wherein the computing device is further configured to:
receive a registration request from the at least one first user, the plurality of second users, and the at least one third user; and
generate at least one reward-point identifier (RP-ID) using a cryptographic method to the requested at least one first user, plurality of second users, and at least one third user for receiving the at least one recommendation, providing the at least one input, and registering at least one service detail respectively.

15. The recommendation system of claim 14, wherein the computing device is further configured to: generate the at least one RP-ID by:
generating a plurality of public keys for the requested at least one of the at least one first user, the plurality of second users, and the at least one third user;
generating a plain identifier (plain_id) by converting user details associated with the requested at least one of the at least one first user, the plurality of second users, and the at least one third user into at least one number; and
generating an encrypted data using the plurality of public keys, and the generated plain_id, wherein the generated encrypted data is the at least one RP-ID for the requested at least one of the at least one first user, the plurality of second users, and the at least one third user into at least one number.

16. The recommendation system of claim 12, wherein the computing device is further configured to:
check if a number of computing nodes verified the received at least one input and trustworthiness of the at least one second user satisfies a threshold; and
accept the received at least one input as at least one verified input and storing the at least one verified input in blocks of a blockchain of the blockchain networking system if the number of computing nodes verified the received at least one input and trustworthiness of the at least one second user satisfies the threshold.

17. The recommendation system of claim 16, wherein the computing device is further configured to: discard the received at least one input if the number of computing nodes verified the received at least one input and trustworthiness of the at least one second user does not satisfy the threshold.

18. The recommendation system of claim 16, wherein the computing device is further configured to:
generate at least one reward point (RP) to at least one of the at least one second user from whom the at least one input is received and the at least one third user who is included in the received at least one input on verifying the received at least one input;
issue the generated at least one RP to at least one of the at least one RP-ID of the at least one second user and the at least one RP-ID of the at least one third user; and
communicate the received at least one recommendation request, the at least one verified input and RPs associated with the at least one verified input to the recommendation engine for providing the at least one recommendation, wherein the RPs associated with the at least one verified input refers to the at least one RP issued to the RP-ID of the at least one second user from whom the at least one verified input is received and to the RP-ID of the at least one third user who is included in the at least one verified input.

19. The recommendation system of claim 18, wherein the at least one RP is generated based on at least one factor including at least one of frequency of the at least one verified input, a number of conversions of the at least one verified input into the at least one recommendation, current reward points (RPs) associated with the at least one RP-ID of the at least one second user, and the at least one third user, cost of the at least one verified input, position of the at least one verified input on the blockchain and the recommendation engine.

20. The recommendation system of claim 12, wherein the recommendation engine is further configured to:
add the received at least one verified input as the at least one recommendation in the tier of recommendations with a lowest priority if the received at least one verified input does not match with the at least one recommendation of the plurality of recommendations maintained across the multiple tiers of recommendations.

21. The recommendation system of claim 12, wherein the recommendation engine is further configured to:
select the at least one recommendation from the plurality of recommendation maintained at the tier of recommendations with a highest priority based on the received at least one recommendation request, and the recommendation details associated with the plurality of recommendations; and
provide the selected at least one recommendation to the requested at least one first user.

22. The recommendation system of claim 21, wherein the recommendation engine is further configured to:
update the recommendation details of the at least one recommendation provided to the requested at least one first user across the multiple tiers of recommendations;
communicate the provided at least one recommendation and the updated at least one recommendation details to the verification and reward issuance engine, wherein the verification and reward issuance engine modifies the RPs associated with the provided at least one recommendation; and
change a position of the provided at least one recommendation across the multiple tiers of recommendations on receiving the modified RPs associated with the provided at least one recommendation.

23. A recommendation engine coupled with a verification and reward issuance engine in a recommendation system, the verification and reward issuance engine comprising:
a plurality of distributed servers configured to:
maintain a plurality of recommendations and associated recommendation details across multiple tiers of recommendations indicating priority for the plurality of recommendations, wherein the plurality of recommendations are previous recommendations corresponding to previous recommendation requests; and
a control server coupled with the plurality of distributed servers configured to:

maintain at least one of user details, service details, the plurality of recommendations and the recommendation details, and a tier-server recommendation mapping;

control functions of the plurality of distributed servers based on the tier-server-recommendation mapping;

determine a tier of recommendations associated with the at least one recommendation as a current tier for the received at least one verified input based on the tier-server-recommendation mapping if the corresponding at least one recommendation matches with the received at least one verified input;

determine an updated tier for the received at least one verified input using the RPs associated with the at least one verified input, and a RP threshold criteria associated with the identified current tier, wherein the updated tier is at least one of a succeeding tier and a preceding tier of the current tier of recommendations, and the same current tier;

update the plurality of recommendations by enabling the at least one distributed server positioned at the current tier to transfer the at least one recommendation matching the received at least one verified input to the at least one distributed server positioned at the updated tier of recommendations if the determined updated tier is at least one of the succeeding and preceding tiers of the current tier of recommendations; and provide at least one recommendation to at least one user from the plurality of recommendations maintained by the plurality of distributed servers on receiving at least one verified input and associated RPs and at least one recommendation request of the at least one user from the verification and reward issuance engine, wherein the control server is further configured to:

determine if the received at least one verified input matches with at least one recommendation of the plurality of recommendations maintained by the plurality of distributed servers across the multiple tiers of recommendations; and enable at least one distributed server positioned at the tier of recommendations with a lowest priority to maintain the received at least one verified input as the at least one recommendation if the received at least one verified input does not match with the at least one recommendation of the plurality of recommendations maintained across the multiple tiers of recommendations.

24. The recommendation engine of claim 23, wherein the control server is further configured to:

select the at least one recommendation from the plurality of recommendation maintained by the at least one distributed server positioned at the tier of recommendations with a highest priority on updating the plurality of recommendations; and provide the selected at least one recommendation to the requested at least one user.

25. The recommendation engine of claim 24, wherein the at least one recommendation is selected based on based on the received at least one recommendation request, and the recommendation details associated with the plurality of recommendations.

26. The recommendation system of claim 25, wherein the recommendation engine is further configured to:

update the recommendation details of the at least one recommendation provided to the requested at least one first user;

communicate the provided at least one recommendation and the updated at least one recommendation details to the verification and reward issuance engine, wherein the verification and reward issuance engine modifies the RPs associated with the provided at least one recommendation; and change a position of the provided at least one recommendation across the multiple tiers of recommendations on receiving the modified RPs associated with the provided at least one recommendation.

* * * * *